(12) United States Patent
Neidorff et al.

(10) Patent No.: US 7,706,151 B2
(45) Date of Patent: *Apr. 27, 2010

(54) METHOD AND APPARATUS FOR MULTI-PHASE POWER CONVERSION

(75) Inventors: Robert Alan Neidorff, Bedford, NH (US); Isaac Cohen, Dix Hills, NY (US); Richard L. Valley, Nashua, NH (US)

(73) Assignee: Texas Instruments Incorporated, Dallas, TX (US)

( * ) Notice: Subject to any disclaimer, the term of this patent is extended or adjusted under 35 U.S.C. 154(b) by 385 days.

This patent is subject to a terminal disclaimer.

(21) Appl. No.: 11/799,352

(22) Filed: May 1, 2007

(65) Prior Publication Data
US 2007/0253223 A1 Nov. 1, 2007

Related U.S. Application Data

(60) Provisional application No. 60/796,420, filed on May 1, 2006.

(51) Int. Cl.
*H02K 47/22* (2006.01)
(52) U.S. Cl. .......................................................... 363/9
(58) Field of Classification Search ................. 323/222, 323/234, 237, 271, 272, 282, 284, 299; 331/2, 331/14, 16, 34, 45, 57; 363/2, 9

See application file for complete search history.

(56) References Cited

U.S. PATENT DOCUMENTS 5,793,191 A 8/1998 Elmore et al.
(Continued)

OTHER PUBLICATIONS

Infineon Technologies, CCM-PFC, ICE1PCS01, *Standalone Power Factor Correction (PFC) Controller in Continuous Conduction Mode (CCM)*, Datasheet, V1.3, Feb. 6, 2007.

(Continued)

*Primary Examiner*—Adolf Berhane
*Assistant Examiner*—Yemane Mehari
(74) *Attorney, Agent, or Firm*—John J. Patti; Wade J. Brady, III; Frederick J. Telecky, Jr.

(57) ABSTRACT

A system and method for power conversion synchronizes multiple phases at a desired phase angle difference. The power conversion involves variable frequency switching, fixed on-time and provides power factor correction. A relative measure of a phase angle difference between two phases permits each phase to be controlled to obtain the desired phase angle difference. The power conversion involves transition mode switching to help reduce switching losses. A phase angle difference detector may be provided for each phase. The various phases may have different inherent frequencies that vary with switching frequency, and are synchronized to an average frequency. Current measures can be taken with a single component, such as a resistor. A maximum frequency control limits period width to avoid high frequency switching. An added switch on time improves input voltage crossover distortion. One or more phases can be deactivated in light load conditions.

28 Claims, 25 Drawing Sheets

U.S. PATENT DOCUMENTS

| | | | |
|---|---|---|---|
| 6,495,995 B2 * | 12/2002 | Groom et al. | 323/283 |
| 6,750,637 B2 * | 6/2004 | Nagaki et al. | 323/272 |
| 6,806,689 B2 * | 10/2004 | Schuellein et al. | 323/272 |
| 6,967,854 B2 * | 11/2005 | Lai et al. | 363/65 |
| 6,979,980 B1 * | 12/2005 | Hesterman et al. | 323/222 |
| 7,053,713 B1 * | 5/2006 | Dening | 330/276 |
| 7,138,789 B2 * | 11/2006 | Moussaoui et al. | 323/272 |
| 7,265,522 B2 * | 9/2007 | Sutardja et al. | 323/222 |
| 7,301,400 B1 * | 11/2007 | Dening | 330/276 |
| 7,342,386 B2 * | 3/2008 | Wildash | 323/272 |
| 2007/0253224 A1 * | 11/2007 | Cohen et al. | 363/9 |
| 2007/0262756 A1 * | 11/2007 | Valley et al. | 323/234 |
| 2007/0262823 A1 * | 11/2007 | Cohen et al. | 331/45 |

OTHER PUBLICATIONS

On Semiconductor Publication NCP1601A, NCP1601B, *Compact Fixed Frequency Discontinuous or Critical Conduction Voltage Mode Power Factor Correction Controller*, Semiconductor Components Industries, LLC, Dec. 2005.

ST, L6563, *Advanced transition-mode PFC controller*, STMicroelectronics, Mar. 2007.

Fairchild Semiconductor Corporation, Application Note AN-6026, *Design of Power Factor Correction Circuit Using FAN7529*, Oct. 16, 2006.

* cited by examiner

ONE-SHOT A OUTPUT

INDUCTOR L1 CURRENT

ZERO CURRENT HERE...

...CAUSES VOLTAGE ZERO-CROSSING...

...WHICH RESTARTS ONE-SHOT

VOLTAGE ACROSS INDUCTOR L1
=
VOLTAGE INTO COMPARATOR C1

LATCH THIS COUNT, WHICH REPRESENTS CYCLE TIME

COUNT UP EACH CYCLE

DELAY HALF OF THAT CYCLE TIME

EQUAL

START ONE-SHOT B AT HALF CYCLE

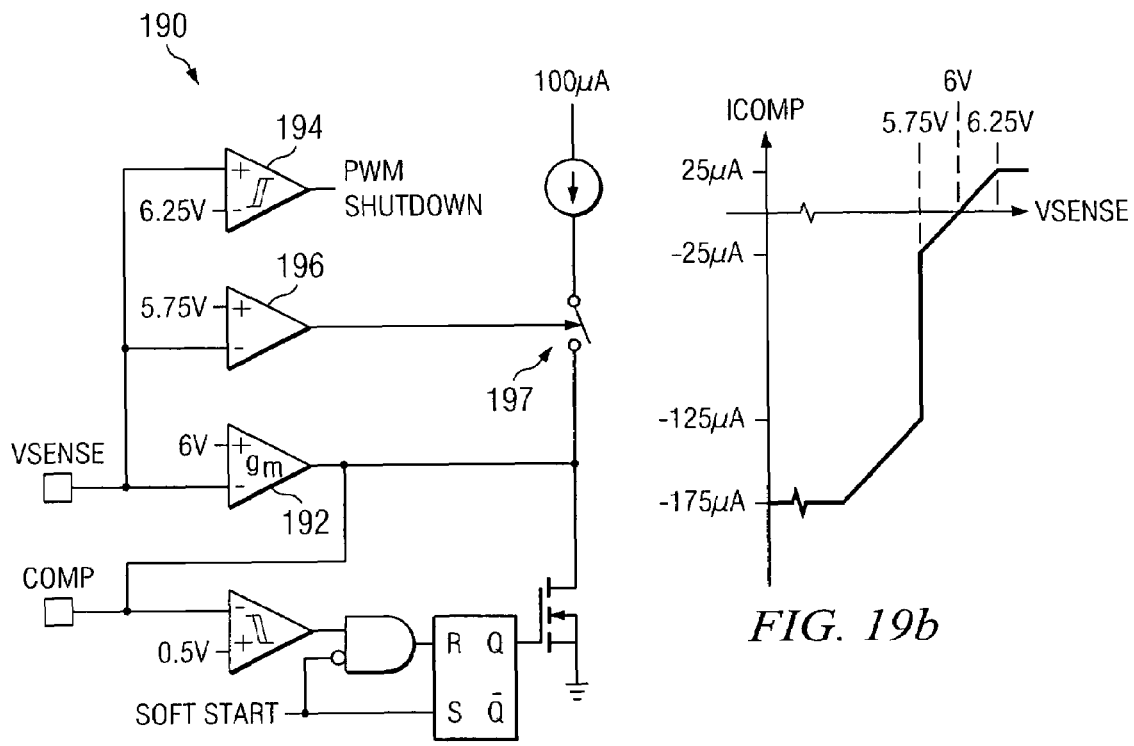
*FIG. 19a*
*FIG. 19b*
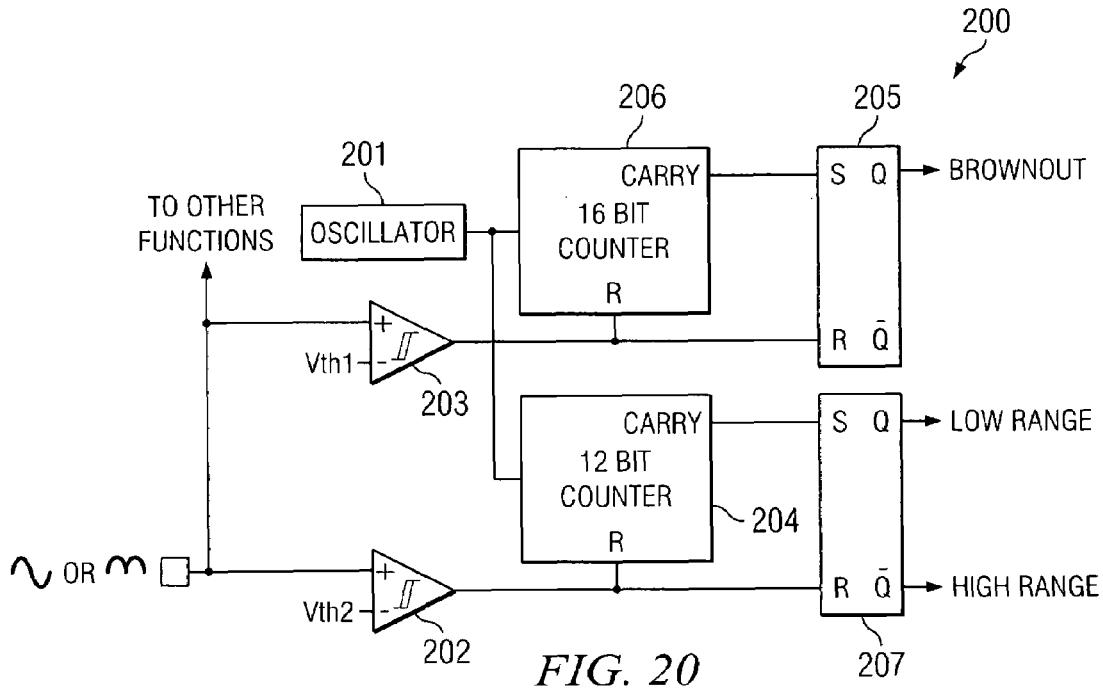
*FIG. 20*

METHOD AND APPARATUS FOR MULTI-PHASE POWER CONVERSION

CROSS REFERENCE TO RELATED APPLICATIONS

This application is based on and claims benefit of U.S. Provisional Application Ser. No. 60/796,420, filed May 1, 2006. This application is related to U.S. application Ser. No. 11/708,820 filed Feb. 21, 2007, U.S. application Ser. No. 11/799,181 filed May 1, 2007, and U.S. application Ser. No. 11/799,190 filed May 1, 2007.

STATEMENT REGARDING FEDERALLY SPONSORED RESEARCH OR DEVELOPMENT

Not Applicable

BACKGROUND OF THE INVENTION

1. Field of the Invention

The present invention relates generally to multiple power converters used in conjunction, and relates more particularly to synchronization of power converters used in conjunction with interleaved phases.

2. Description of Related Art

Performance improvements in interleaved, multiphase power supplies result from advantages such as reduced input current ripple, reduced peak output current and higher frequency output ripple current. The higher frequency output ripple current permits easier filtering of the output ripple current to remove the ripple. Multiple interleaved phases in switching power supplies also tends to improve power conversion efficiency. A particular type of multiphase switching power supply has a variable switching frequency to obtain desired power supply output characteristics.

A variable frequency switching power supply may operate in various modes at various times, depending upon desired characteristics. For example, a switching power supply may operate in continuous, discontinuous or transition mode, each of which have various advantages. For example, a switching power supply may have an inductor that is supplied with current for a given interval and permitted to discharge to a certain extent. Such a switching power supply operating in a continuous mode permits an inductor to discharge to a point where the inductor current is still positive, or above zero, before charging the inductor again. A discontinuous mode switching power supply permits the current in the inductor to drop and remain at zero for a finite time before charging the output inductor again in a subsequent switching cycle. A transition mode switching power supply permits the inductor to discharge to zero current, at which point a new charging cycle begins, so that the inductor current is prevented from becoming negative or remaining zero.

One advantage to transition mode operation is the potential for zero voltage and/or zero current switching in the power supply. Zero voltage switching and zero current switching permits switching losses to be reduced, which can be especially advantageous at high frequencies.

Another advantage to transition mode operation is that it provides a simple way to maintain a desired power factor for a power converter. A typical transition mode configuration for a power converter permits the current in the inductor to achieve a peak value that is proportional to the input voltage. The momentary average of the current through the inductor is proportional to the instantaneous value of the input voltage, which permits the power converter to draw power from an input source at unity power factor. It is desirable to maintain the power factor as close as possible to unity, so that the power converter appears as a purely resistive load on the input power line. Factors that contribute to improving the power factor include maintaining input voltage in phase with input current, and maintaining the input current as a sinusoid when the input voltage is a sinusoid. Transition mode operation tends to help support realization of a good power factor in a variable frequency switching power supply.

A variable frequency transition mode power converter can be viewed as a free running oscillator with the frequency being controlled by the amplitude of the inductor current. Two or more transition mode power converters may be paralleled to produce multiple phases and obtain the advantages discussed above. Due to the variable frequency nature of the power supply switching, it can be challenging to synchronize the various phases to obtain one or more of the above-described advantages, especially as frequency changes to deliver desired output power characteristics. One variable in the synchronization of the phases is the number of phases that are interleaved or combined. For example, if a multiphase interleaved power supply has two phases, the phase angle difference of the waveforms in each phase should be 180°. For a three-phase interleaved power supply, the phase angle difference for the waveforms in each phase should be maintained at 120°. In general, the phase angle separation is equal to 360°/N, where N is the number of phases in the interleaved power supply.

One way to correct for mismatch in phase separation is to employ a Phase Locked Loop (PLL) to maintain an appropriate phase angle separation. Such a concept is illustrated in U.S. Pat. No. 5,793,191, where a slave stage of a power converter is maintained 180° out of phase with a master power converter stage. This arrangement calls for special purpose components that can add to power converter cost, complexity and size. One drawback to this approach is the challenge of acquiring and maintaining a phase lock over a wide range of conditions. The PLL capture range must encompass the difference between the free-running frequencies of the master and slave(s), which may prove difficult or costly in practice. For example, if a change in load demand causes switching frequency to change rapidly, a large momentary frequency error may result, which can cause loss of phase lock.

SUMMARY OF THE INVENTION

Briefly stated, the present disclosure provides a system and method for power conversion that synchronizes multiple phases at a desired phase angle difference. The power conversion involves variable frequency switching, fixed on-time and provides power factor correction. A relative measure of a phase angle difference between two phases permits each phase to be controlled to obtain the desired phase angle difference. The power conversion involves transition mode switching to help reduce switching losses. A phase angle difference detector may be provided for each phase. The various phases may have different inherent frequencies, the waveforms of which are synchronized to a given common, or average, frequency.

According to one embodiment, the disclosure provides a power converter with two interleaved phases having periodic waveforms. The converter may include one or more waveform generators to control generation of the periodic waveforms. In addition, a phase detector is coupled to one or more of the waveform generators to generate an indication of a phase angle difference between the periodic waveforms. The waveform generator is responsive to the indication to control the generation of both periodic waveforms to form a desired phase angle difference between the periodic waveforms.

The power converter may have another phase detector coupled to a waveform generator to generate another indication of another phase angle difference. The waveform generator is responsive to one indication to control generation of one of the periodic waveforms and is responsive to the other indication to control generation of another periodic waveform. The waveform generator causes the desired phase angle difference to be formed based on a relative relationship between the periodic waveforms. According to one exemplary aspect of the disclosed concept, the indication of the phase angle difference contributes to proportioning a rise or fall time of a corresponding periodic waveform.

Two or more waveform generators may be used to generate the periodic waveforms. Each waveform generator is responsive to a separate indication of a relative phase angle difference between periodic waveforms of different phases. The relative phase angle difference is a differential measure between cycles of periodic waveforms of different phases, as measured from one phase to the other, using either phase as the starting point. The relative phase angle difference can thus be a measure from a first phase to another, a measure from another phase to the first, or both. The use of both relative measures provides additional control freedoms to help speed the relative synchronization of the phases at a desired phase angle difference. The phase angle difference may be determined, for example, by measuring a time interval between cycle start points of the periodic waveforms of two different phases.

The relative phase angle difference can be a measure between two different phases that are not necessarily consecutively ordered in time. For example, the differential measure between cycles may be drawn between phases 2 and 5 in a six phase system, or between any combination of phases. The relative phase angle difference offers a relative measure between two of the phases, taken from the perspective of either phase, to contribute to controlling the respective periodic waveforms to have a desired phase angle difference.

The one or more waveform generators can each be operated to obtain a power factor correction (PFC) in each phase by controlling the generation of each of the respective periodic waveforms, while operating with variable switching frequency. The power conversion can be achieved with different operational modes, including transition, continuous and discontinuous modes.

The phase detector may include a device used to measure an interval between cycles of periodic waveforms of different phases. For example, a capacitor, counter or timer may be provided in the phase detector to contribute to producing the indication of phase angle difference.

A feedback signal representative of the periodic waveform in a phase may be provided to a respective waveform generator to contribute to controlling generation of the periodic waveforms. The feedback signal may indicate, for example, when a switching event should occur to achieve desired parameters such as output voltage, current or power levels.

According to another exemplary embodiment, the disclosure provides a power converter with a plurality of interleaved phases having periodic waveforms that are synchronized. The converter includes one or more waveform generators that provide periodic signals used to generate the periodic waveforms. One or more phase detectors coupled to the waveform generator(s) provide an indication of a relative time interval between cycles of two of the periodic signals provided by the waveform generator(s). The waveform generator(s) is(are) responsive to the indication to modify the periodic signals to control or modify the generation of the periodic waveforms such that the periodic waveforms have a desired phase angle difference.

According to another exemplary embodiment of the present disclosure, a method of power conversion involving a power converter that has a plurality of interleaved phases synchronizes the periodic waveforms in the phases to a desired phase angle difference. The method includes generating a plurality of periodic signals to form the periodic waveforms. An indication of a relative time interval between cycles of at least two of the periodic signals that are each associated with a different phase is obtained. Based on the indication, the at least two periodic signals are controlled or changed to modify the generation of the periodic waveforms such that the periodic waveforms have a desired phase angle difference.

According to another exemplary embodiment, the present disclosure provides a power converter with a first and a second waveform generator to generate a first and a second periodic waveform representative of a first and a second phase. A first and a second phase detector are coupled to the first and second waveform generators, respectively, and provide a first and a second indication of a relative time interval between a cycle of a respective periodic waveform and a cycle of another periodic waveform from a different phase. The first and second waveform generators are responsive to the respective first and second indications to influence the generation of the respective first and second periodic waveforms to form a desired phase angle difference between the respective periodic waveforms.

According to an embodiment of the present invention, the phases of a two-phase power converter are synchronized by monitoring cycle start points for each phase. The cycle start points contribute to determining a relative phase difference between the phases. The duration of a period for the cycles of each phase is adjusted to synchronize frequencies and obtain a desired phase angle difference.

In accordance with a feature of the present invention, two or more phases in a multiphase power converter are synchronized based on detection of a zero crossing of a given phase. Synchronization based on detection of a zero crossing permits a simplified logic construct to indicate the start of a subsequent phase. A power supply output feedback error signal may contribute to adjustment of the phase separation.

According to one embodiment, a cycle length is measured for a phase in a two phase system. The measurement is divided in half to mark the point at which the other phase of the two-phase system should begin. By setting the second phase to begin at a halfway point for the first phase cycle, the two phases are maintained 180° apart.

According to another exemplary embodiment, a phase match filter provides signals for adjusting phase separation based on zero crossing points of the phase cycle. The system provides phase adjustments based on event timing, that is, zero crossings, in conjunction with the phase match filter. The system operates based on a combination of continuous and digital signals, so that both analog and digital inputs are accepted for driving the switches of the various phases. A digital control for the phase adjustment system decreases circuit complexity and cost, while improving PFC.

In an embodiment featuring a two-phase power converter, a periodic waveform in each of the phases is monitored and adjusted with respect to the other phase. The periodic waveforms are control signals used to drive power switches that operate to charge and discharge an inductor. A new period in each phase begins when the respective inductor discharges to zero current. Control of charging and discharging intervals is responsive to a phase control circuit and a feedback signal for each of the phases. Each of the phases is adjusted by a phase adjuster by shortening or lengthening the charge or discharge portion of the waveform representing each of the phases. The phase adjuster influences the feedback signal controlling the shape of the periodic waveform in the corresponding phase, based on information from the other phase. The phase adjuster modifies the shape of the periodic waveform to urge the operating phase difference toward a desired phase difference.

In another embodiment featuring an exemplary three-phase power converter, the phase angle relationship between the phases is controlled based on period information and a phase angle difference between each of the three phases. Compared to a given phase, the cycle period of another phase is adjusted based on an arrangement of a plurality of phase angle difference measurement circuits and a plurality of phase feedback signals. Each of the plurality of phase feedback signals is influenced by an output of at least one of the plurality of phase angle difference measurement circuits to contribute to controlling a periodic waveform value in the respective phase. The control of the periodic waveform urges the operating phase angle difference toward a desired phase angle difference.

The three-phase power converter can be modified to process more than three phases with relatively simple modifications.

The disclosed system and method contribute to improving circuit efficiency by improving power factor while maintaining zero volt and zero current switching. The disclosed system and method also operate to reduce or eliminate the impact of inductor tolerances upon phase separation mismatches. That is, because the control operates based on zero current crossings, variations in the tolerances of the inductors do not impact the control of phase separation.

BRIEF DESCRIPTION OF THE DRAWINGS

FIG. 19a is a circuit block diagram illustrating loop gain control according to an embodiment of the present invention;

FIG. 19b is a graph illustrating current versus voltage for the loop gain circuit of FIG. 19a;

FIG. 20 is a circuit block diagram for under-voltage and line range selection according to an embodiment of the present invention;

DETAILED DESCRIPTION OF THE INVENTION

This application claims the benefit of U.S. Provisional Application Ser. No. 60/796,420, filed May 1, 2006, the entire content of which is hereby incorporated herein by reference.

Figure 1A:
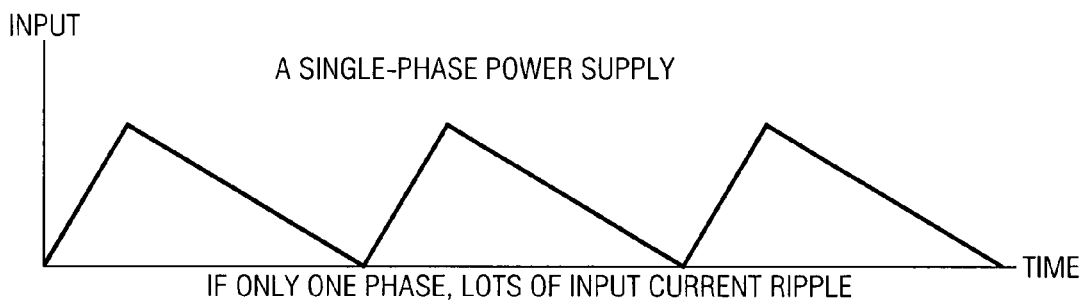
FIGS. 1a-1d are a set of graphs illustrating interleaved multiple phase power supply operation.
Figure 1B:
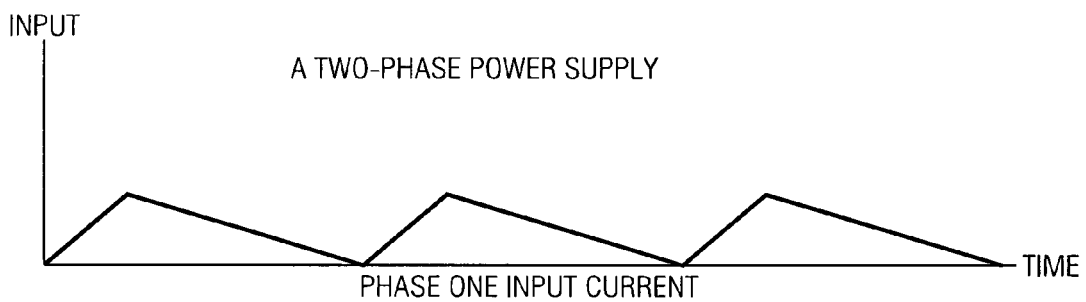
Figure 1C:
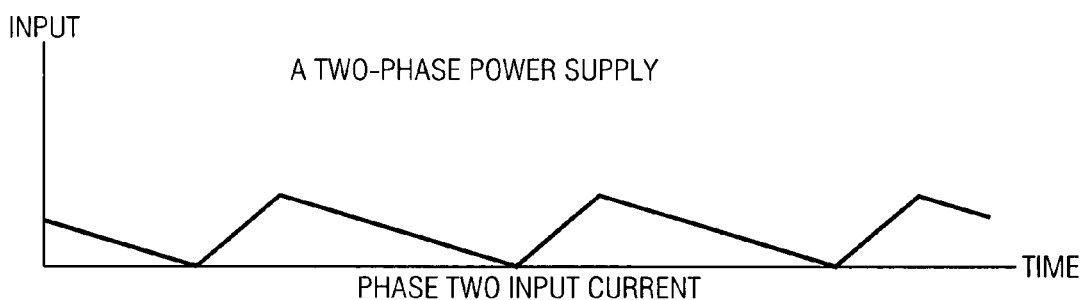
Figure 1D:
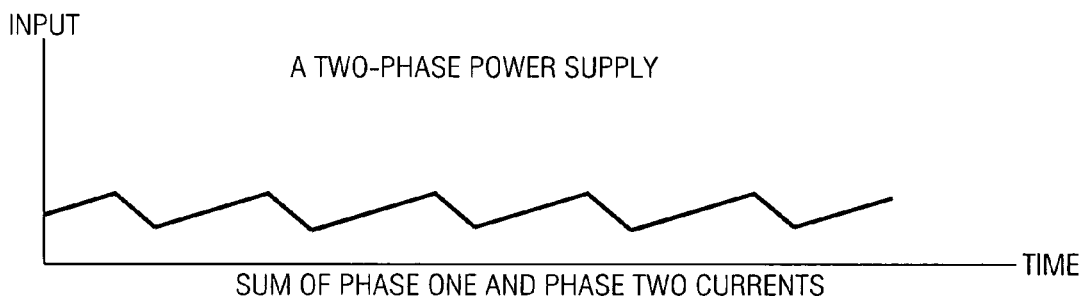

Referring to FIGS. 1a-1d, plots of input current verses time are illustrated for a single phase power supply and a power supply with two interleaved phases. FIG. 1a illustrates a single phase power supply that exhibits a significant amount of input current ripple. FIGS. 1b-1d illustrate input current for each of two phases, and the sum of the current of the two phases, respectively. The sum of the two current phases shown in FIG. 1d produces a current with lower peak current, lower ripple, and a ripple frequency that is twice the frequency of the two input current phases. A variable frequency PWM control may be used to produce an interleaved multiphase power supply with such an advantageous summed current. However, the realization of the variable frequency PWM control is somewhat challenging in that properly synchronizing the separate phases can be difficult when the phases vary in frequency.

Figure 2A:
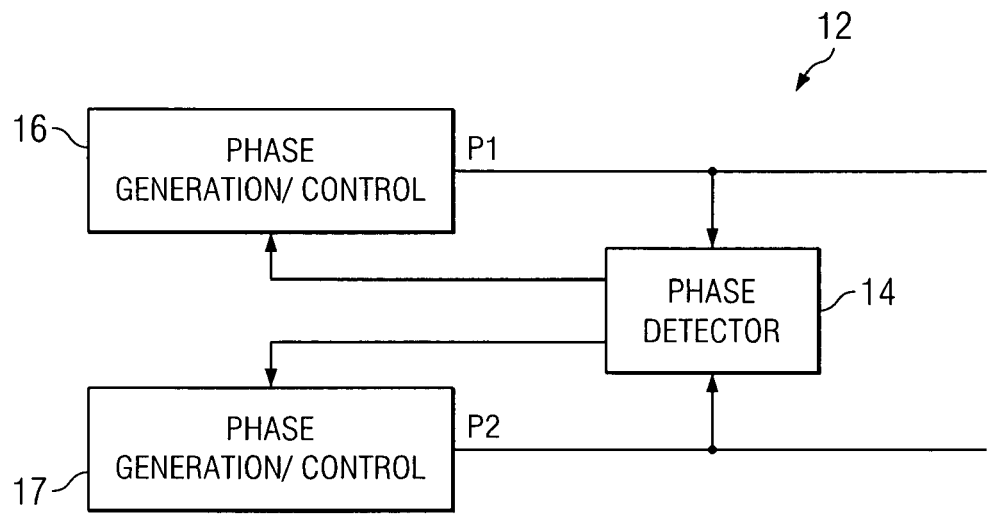
FIGS. 2a-2b are block diagrams illustrating a concept of the present invention.

Referring to FIG. 2a, an abstract block diagram of an interleaved multiphase power converter 12 is illustrated. Power converter 12 includes two phases, P1 and P2, that have periodic waveforms controlled to have a phase difference of 180°. A phase detector 14 inspects the waveforms of phases P1 and P2 and provides relative phase information to phase generation/control components 16, 17. Phase detector 14 provides a relative phase measure to each component 16, 17, based on phase information derived from an alternate phase. Accordingly, phase detector 14 inspects the periodic waveform of phase P2 to provide phase information to component 16, and inspects the periodic waveform of phase P1 to provide phase information to component 17. Each of components 16, 17 modify phases P1 and P2, respectively, based on the phase information provided by phase detector 14. As each of components 16, 17 modify their respective phases P1, P2, phase detector 14 provides further relative phase information feedback, thereby providing a closed loop relative phase angle difference control.

The periodic waveforms in phases P1, P2 may be power signals that are interleaved to produce a summed output with reduced peak current, reduced ripple, and higher frequency ripple. Alternately, the periodic waveforms in phases P1 and P2 can be control signals provided to power components that produce period power waveforms. In the exemplary configuration illustrated in FIG. 2a, a single phase detector 14 is provided for two phases P1 and P2. The configuration of FIG. 2a is a special case of the present invention involving two phases, the periodic waveforms of which are separated by 180°.

Figure 2B:
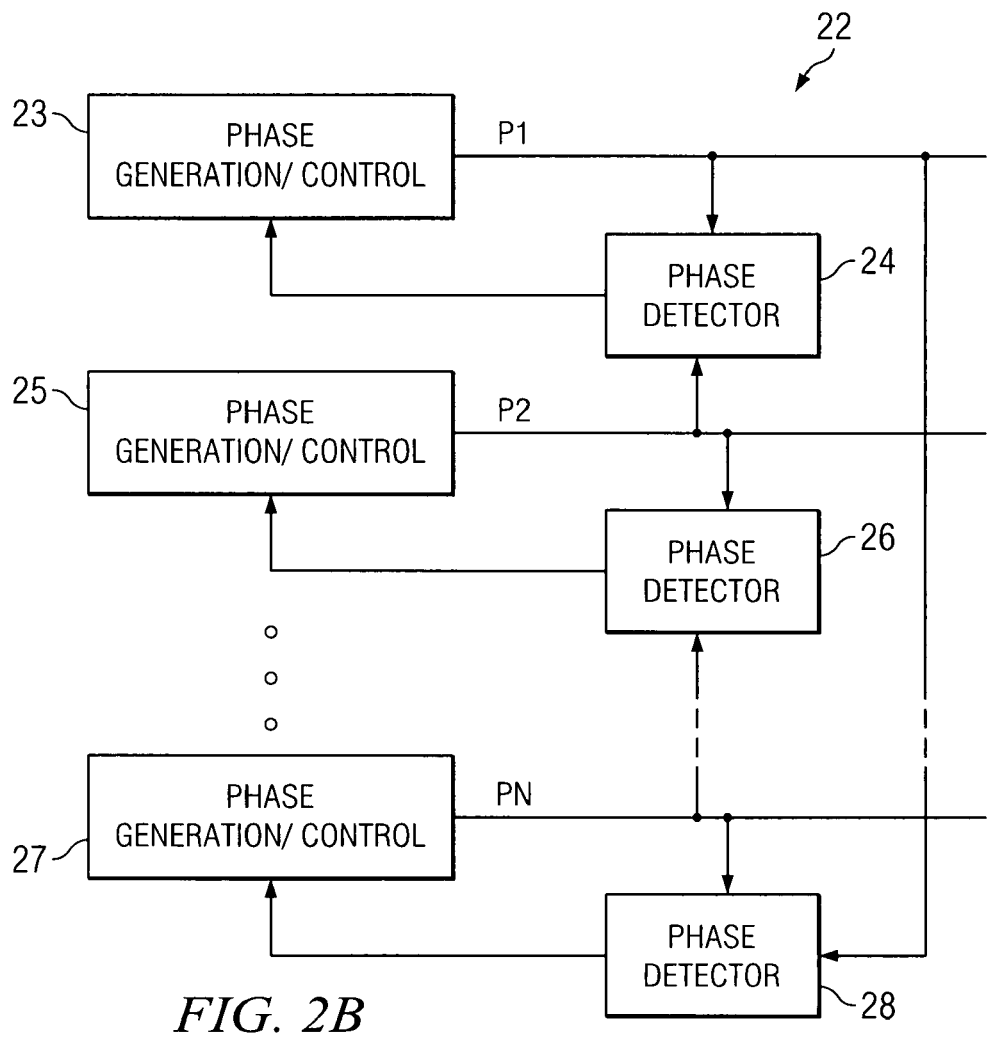

Referring now to FIG. 2b, a generalized multiphase interleaved power converter 22 is illustrated. Power converter 22 has a general number of phases N, denoted as phases P1-PN. Phase generation/control components 23, 25 and 27 generate periodic waveforms in each of phases P1, P2 and PN, respectively. Phases P1-PN can be combinations of signals for controlling power components to generate periodic power waveforms or the periodic power waveforms themselves. In the general case illustrated in FIG. 2b, there is a phase detector for each phase in power converter 22. The feedback provided by phase detectors 24, 26 and 28 each depend upon two phases to obtain a relative phase measure. Accordingly, the phase information inputted into each phase detector 24, 26 and 28 is used to obtain a feedback signal to control the generation of a respective phase P1-PN to have a desired phase angle separation between the periodic waveforms of phases P1-PN. Accordingly, the control of the periodic waveform in each phase P1-PN depends upon a phase angle measurement from two different phases. When any of phase detectors 24, 26 or 28 detect a phase angle difference error, a correction to reduce the error propagates through components 23, 25 and 27 to adjust relative phase angle difference until the error is reduced for all phases. The propagation of the error through the phases synchronizes the periodic waveforms in each phase to have an overall desired phase angle separation between each phase. By synchronizing the period waveforms, the operating frequencies of phases P1-PN tend towards a single frequency, so that phases P1-PN is operate at a given frequency. The given frequency tends to be an average of the different independent frequencies of phases P1-PN.

Phases P1-PN can be in any temporal order with respect to leading or lagging. That is, phases P1-PN can be arranged so that phase P2 lags P1 and phase PN lags P2. Alternately, phases P1-PN can be arranged so that phase P1 lags P2 or PN or both. The phase detectors 24, 26 and 28 are arranged to detect the desired relative phase difference in accordance with the temporal order in which phases P1-PN are arranged.

Figure 3:
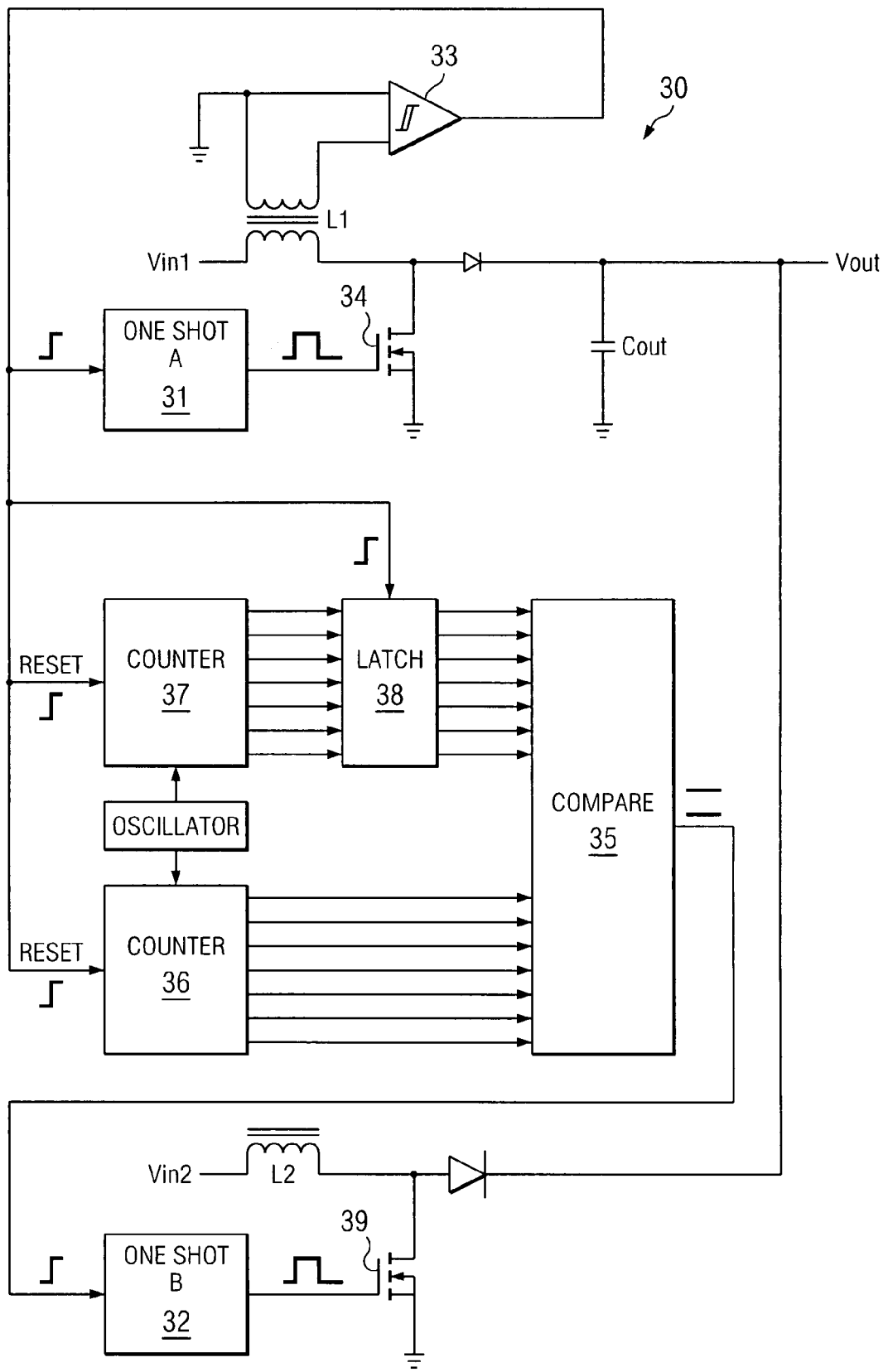
FIG. 3 is a circuit block diagram of an embodiment of the present invention.

Referring to FIG. 3, an implementation of a variable frequency PWM control is illustrated as circuit 30. Circuit 30 operates as a boost-type power supply based on a PWM control to implement a Power Factor Correction (PFC). PWM signals Vin1 and Vin2 represent the two PWM phase input signals. The disclosed system and method operates with any type of interleaved power supply, including buck, buck-boost, flyback and other power supply types. Circuit 30 provides a fixed on-time implementation of an embodiment in accordance with the present invention. One shot components 31, 32 are used to set an on time directed to the start of each phase. One shots 31, 32 may be highly similar to each other in operational characteristics. An on-time start point occurs when a comparator 33 coupled to an inductor L1 senses zero current. A counter 37 is provided to count the number of oscillator cycles from the firing of one shot 31 in a first phase until inductor current drops to zero in that phase. This information related to the phase cycle time is latched with latch 38 and compared to the value of another counter 36 that is activated at the same time as counter 37. When the counter 36 reaches one half of the count maintained in latch 38, one shot 32 is fired. PWM signals Vin1 and Vin2 are thereby maintained 180° out of phase with each other. However, PWM signals Vin1 and Vin2 can range from near 0° to near 360° for respective duty cycles.

In transition mode, inductor L1 is charged to a peak current Ipeak using one shot 31, and then discharged to zero current. Operating in transition mode contributes to reducing or eliminating diode switching losses, and permits immediate restarts. That is, the multiphase system can have zero dead time for switching. The average current is approximately equal to half the peak current Ipeak. The operation based on phase timing reduces or eliminates variations in phase mismatch that may result from inductor tolerance mismatch. For example, it may be very difficult or expensive to match values for inductors L1 and L2 within a given tolerance. The presently disclosed system and method contributes to reducing requirements for inductor tolerances or matching inductor values.

In Circuit 30, the value in counter 37 can be divided in half by shifting the digital value one bit. This fast operation provides for a two-phase interleaved power supply where the phases are separated by 180°. In interleaved power supplies with more than two phases, the latched count, or accumulated value representing the period of a phase, is divided by the number of phases to determine when the next phase should start. An alternate embodiment measures peak average current to determine phase period. A faster clock can also be used instead of dividing the digital signal to reduce the time.

Figure 4A:
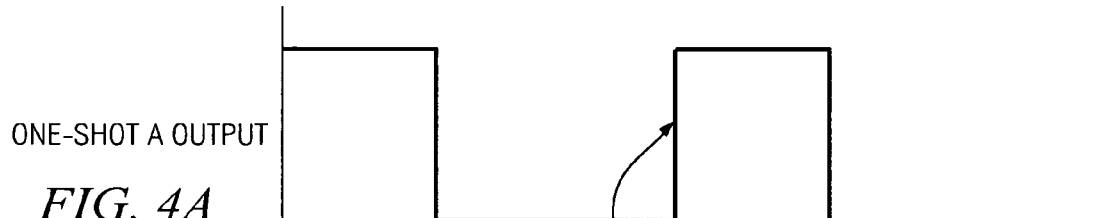
FIGS. 4a-4f are graphs illustrating a method for operation of the circuit of FIG. 3.
Figure 4B:
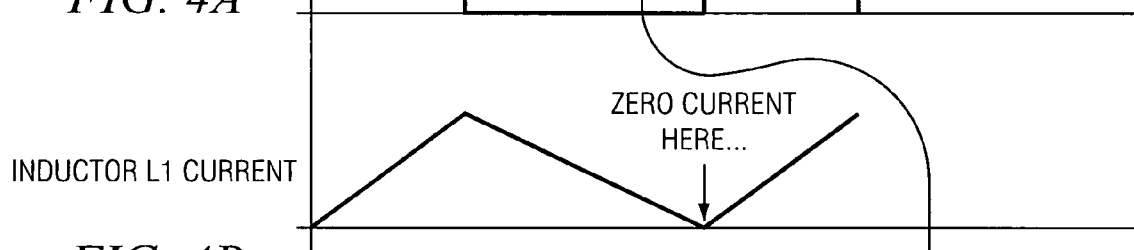
Figure 4C:
Figure 4D:
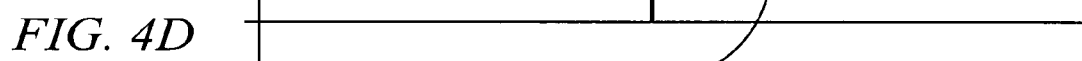

Referring to FIGS. 4a-f, a number of graphs are shown that illustrate operation of the circuit of FIG. 3. In FIG. 4a, one shot 31 fires to produce a current in the first phase as shown in FIG. 4b. Upon reaching zero, the current through inductor L1 triggers the count for the start of the second phase. The count value for the second phase is half the accumulated count value for the first phase in the two-phase supply. FIG. 4c illustrates the change in voltage across the inputs of comparator 33, which is the voltage across inductor L1. Each zero crossing for current in inductor L1 causes a transition in the output of comparator 33. When the output of comparator 33 transitions from low to high, one shot 31 is restarted, latch 38 latches its input, and counters 36, 37 are reset. FIG. 4d illustrates counter 37 counting in a single cycle between resets provided by the output of comparator 33. Each cycle for counter 37 is roughly equivalent to the intervals between rising edges of output pulses provided by one shot 31. The representation of the value of counter 37 illustrated in FIG. 4d is shown as discrete counting steps, with six discrete count levels illustrated in this example. The output of counter 37 is a binary number, provided to an input of latch 38. Accordingly, latch 38 maintains the six-count level as a binary number, which is provided to a digital comparison device 35.

Figure 4E:
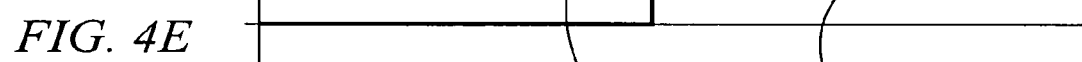
Figure 4F:

Referring to FIG. 4e, a single cycle count value for counter 36 is illustrated. In this example, counter 36 counts up to the same value as that of counter 37, or the value maintained in latch 38. However, counter 36 counts twice as fast as counter 37, so that when counter 36 reaches the value maintained in latch 38, the output of digital comparison device 35 triggers one shot 32. That is, counter 36 counts to the same value as that held in latch 38 to trigger one shot 32, but does so in half the time as does counter 37. Since counter 36 causes one shot 32 to be triggered approximately twice as often as one shot 31 is triggered, the start of the second phase is approximately in the middle of the first phase. One shot 32 is triggered once for every cycle of the first phase, since counter 36 is reset when there is a low to high transition output from comparator 33, indicating zero current in inductor L1. FIG. 4f illustrates one shot 32 initiating the beginning of the second phase when the output of digital comparison device 35 has a transition from low to high.

The configuration of circuit 30 may be modified to permit counters 36 and 37 to count at a same rate, and divide the output of counter 37 or latch 38 by 2 to obtain the same results of starting the second phase midway through the first phase, or maintaining 180° phase separation. If more than two phases are used, the output of counter 37 or latch 38 can be divided by the number of phases to indicate when the next phase should be started. Alternately, counter 36 can be arranged to count n times faster than counter 37, where n is the number of phases.

The exemplary embodiment of the present invention illustrated in FIGS. 3 and 4a-4f provide one shots 31 and 32 that have outputs of variable duration, such as may be dependent upon duty cycles of PWM inputs on Vin1 and Vin2. With such a configuration, inductors L1 and L2 are permitted to charge for variable lengths of time to variable maximum currents. In addition, because of the variable frequency nature of the interleaved PWM PFC, the cycle time for the first phase can vary, which is reflected in the count value for counter 37. That is, counter 37 counts until being reset with the beginning of each cycle of the first phase. Accordingly, the beginning of the second phase correspondingly varies with the length of the cycle reflected by the count in counter 37, so that the beginning of the second phase cycle is midway through the first phase cycle.

Figure 5:
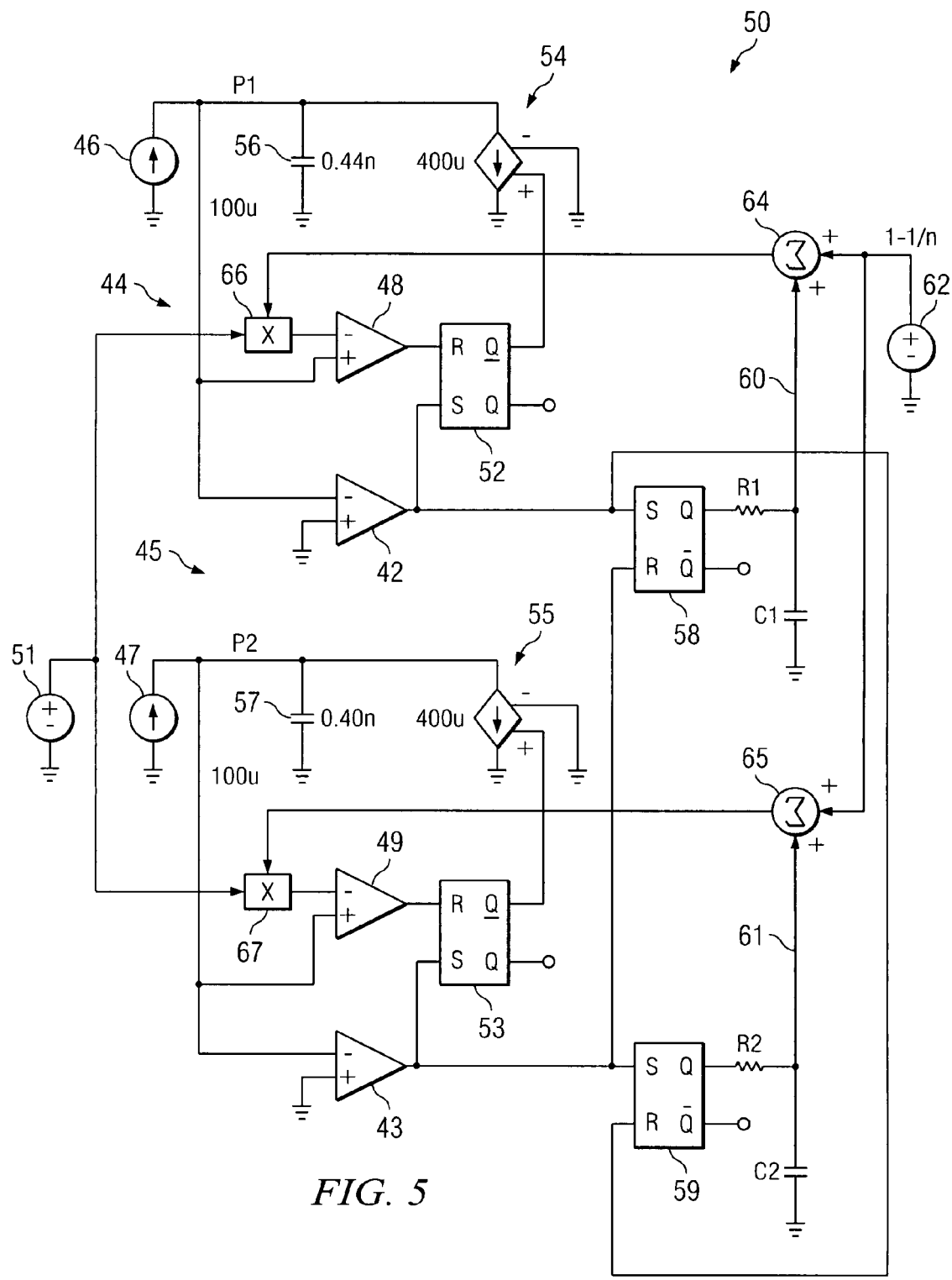
FIG. 5 is a circuit block diagram illustrating the inventive concept applied to a two-phase converter.

Referring now to FIG. 5, another embodiment of the present invention is illustrated as a circuit 50. Circuit 50 includes two oscillators 44,45 composed of current sources 46,47, comparators 48,49, RS flip-flops 52,53, switched current sources 54,55 and timing capacitors 56,57, respectively. Oscillators 44 and 45 produce triangular periodic voltage waveforms across timing capacitors 56,57, by being charged by current sources 46,47 and discharged by switched current sources 54,55, respectively. The outputs of comparators 48,49 and flip-flops 52,53 are rectangular waveforms with a phase angle difference of 180° between oscillators 44,45. The frequency of the triangular waveforms across capacitors 56,57 and the rectangular waveforms output from comparators 48,49 and flip-flops 52,53 have a frequency that is proportional to the value of voltage source 51, which is applied to the inverting inputs of comparators 48,49.

Capacitors 56,57 are illustrated as having different values of capacitants, to indicate that oscillators 44 and 45 operate independently at different frequencies. In accordance with the present invention, the different independent frequencies of oscillators 44,45 are synchronized with a phase difference of 180°. Although not illustrated, phases P1 and P2 representing the triangular waveforms across capacitors 56 and 57, respectively, can be combined in a summing operation to produce an output current with reduced peak output current, reduced input current ripple and higher frequency output ripple current. Such an interleaved output has an improved efficiency for power conversion over that of oscillators 44,45 operating alone.

Flip-flops 58, 59 act as phase detectors to detect a phase angle difference between phases P1 and P2. Flip-flop 58 measures a phase angle difference from phase P1 to phase P2, while flip-flop 59 measures a phase angle difference from phase P2 to phase P1. The relative phase angle difference measurements between phases P1 and P2 is based on a pulse received from comparators 42 and 43. A pulse received on the S input of flip-flop 58 produces a logic high level on the normal output of flip-flop 58, which is applied to a low pass filter composed of resistor R1 and capacitor C1. Similarly, a pulse on the output of comparator 43 provided to the S input of flip-flop 59 produces a logic high level on the normal output of flip-flop 59 that is applied to the low pass filter composed of resistor R2 and capacitor C2. In addition, the pulse output from comparator 42, which marks the beginning of a cycle in phase 1, also resets flip-flop 59 to produce a logic low level at the normal output of flip-flop 59. Similarly, the pulse output of comparator 43 starts a new cycle of phase P2, and resets flip-flop 58 to produce a logic low level at the normal output of flip-flop 58. During operation circuit 50, the average value of the output of flip-flops 58,59 acting as phase detectors will vary from a logic low level to a logic high level as the phase difference between phases P1 and P2 varies from zero to 360°.

Output voltages 60,61 from the low pass filters composed of R1, C1 and R2, C2, respectively, are summed with an offset voltage 62 at summing junction 64,65, respectively. Offset voltage 62 is equal to 0.5 volts in this exemplary embodiment having two phases. In general, offset voltage 62 is set to 1-1/n, where n is the number of phases. The resulting sum provided by summing junction 64,65 is applied to multipliers 66,67, which influence the value of voltage source 51 applied to comparators 48,49, respectively. When the outputs of comparators 48,49 or the outputs of flip-flops 52,53 have frequencies that are equal with a phase difference of 180°, the value applied from summing junctions 64,65 is unity and the period of the waveforms and oscillation frequencies remain unchanged.

When oscillators 44,45 vary in phase difference from 1800, the output of summing junctions 64,65 varies, so that one summing junction output is greater than unity, and the other summing junction output is less than unity. The change in the output value of summing junctions 64,65 cause the frequency of one oscillator to decrease and the frequency of the other oscillator to increase until the phase difference between phases P1 and P2 is driven to approximately 180°. For example, if flip-flop 58 detects a phase difference between phase P1 and P2 that is greater than 180, a greater value for voltage 60 is applied to summing junction 64, increasing the multiplying factor applied to multiplier 66 to greater than unity. The voltage value applied to the inverting input of comparator 48 is thus increased, creating a higher threshold for switching the output of comparator 48. The higher threshold for comparator 48 causes the charging cycle of capacitor

56 to be extended, since flip-flop 52 maintains a high logic level output for a longer period of time. The extended charging cycle increases the period of the periodic waveform in phase P1, which tends to advance the phase angle of phase P1, effectively decreasing the frequency of oscillator 44. Similarly, flip-flop 59 is reset after a shorter interval than usual, causing voltage value 61 to be less than usual, so that the value produced by summing junction 65 is less than unity. Because the multiplying factor applied to multiplier 67 is less than unity, the threshold on the inverting input of comparator 49 tends to be decreased, which shortens the interval over which capacitor 57 charges, since flip-flop 52 changes state from a high logic level to a low logic level sooner. The shortened charging cycle for capacitor 57 tends to decease the period of the periodic waveform in phase P2, which tends to retard the phase angle of phase P2, effectively increasing the frequency of oscillator 45.

If voltage source 51 changes value during operation of circuit 50, the frequencies of oscillators 44 and 45 both change to be proportional to the value of voltage source 51. When oscillators 44,45 change frequency, there may be a small frequency difference between oscillator 44 and 45, due to component tolerances, for example. The small frequency difference between oscillators 44 and 45 is quickly overcome within several cycles so that phases P1 and P2 are again synchronized with a phase angle difference of 180°.

Figure 6:
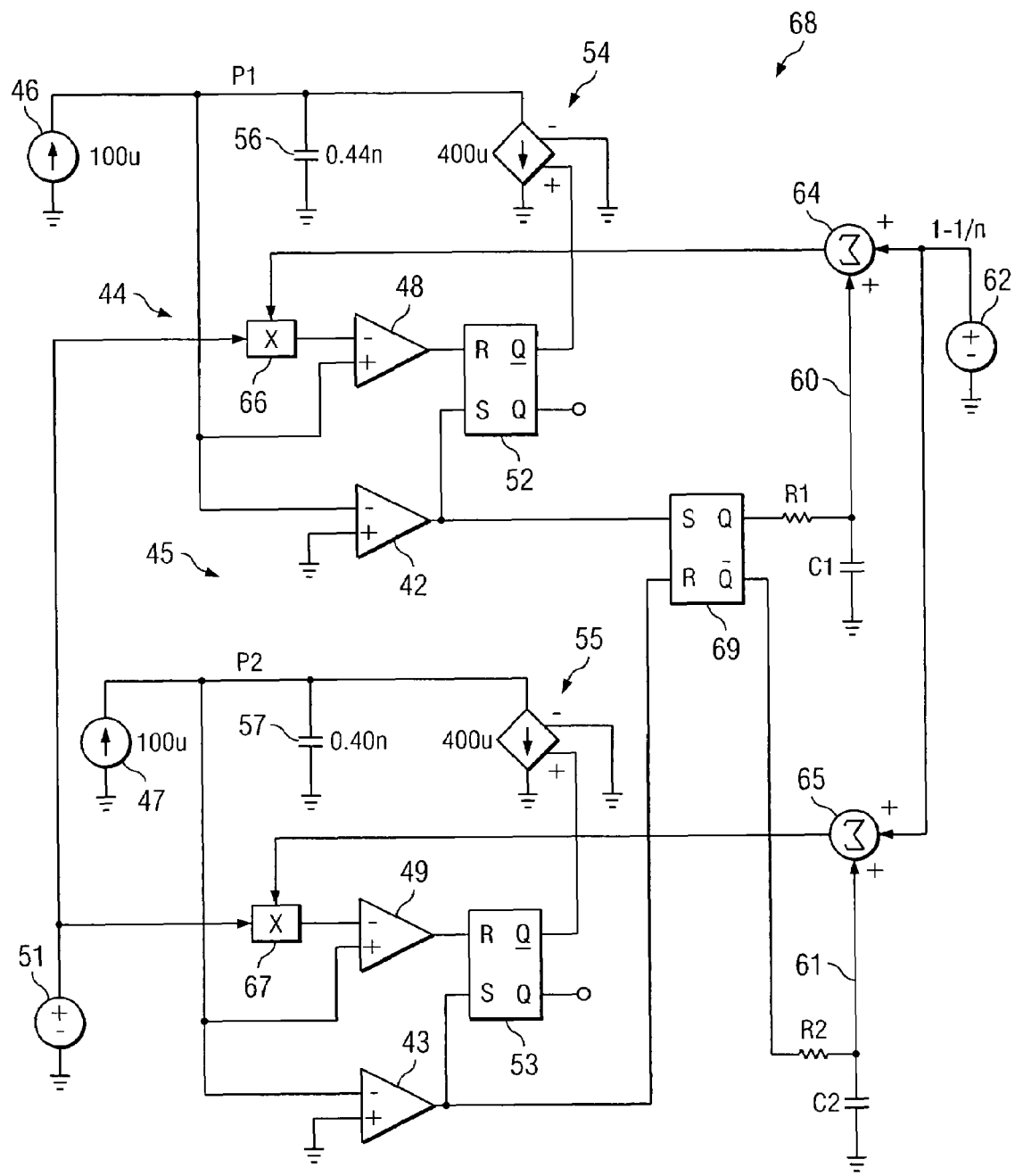
FIG. 6 is a circuit block diagram illustrating the inventive concept applied to a two-phase converter with one phase detector.

Referring now to FIG. 6, another embodiment of the present invention is illustrated as a circuit 68. Circuit 68 is substantially similar in structure and operation to that of circuit 50 illustrated in FIG. 5. Circuit 68 represents a special case of two oscillators in which the two phase detector signals are complimentary, so that a single flip-flop 69 may be used as a phase detector. Accordingly, the special case for two oscillators illustrated in circuit 68 has a single phase detector for two phases, in contrast to the general configuration according to the present invention, where there are the same number of phase detectors as there are phases.

Figure 7:
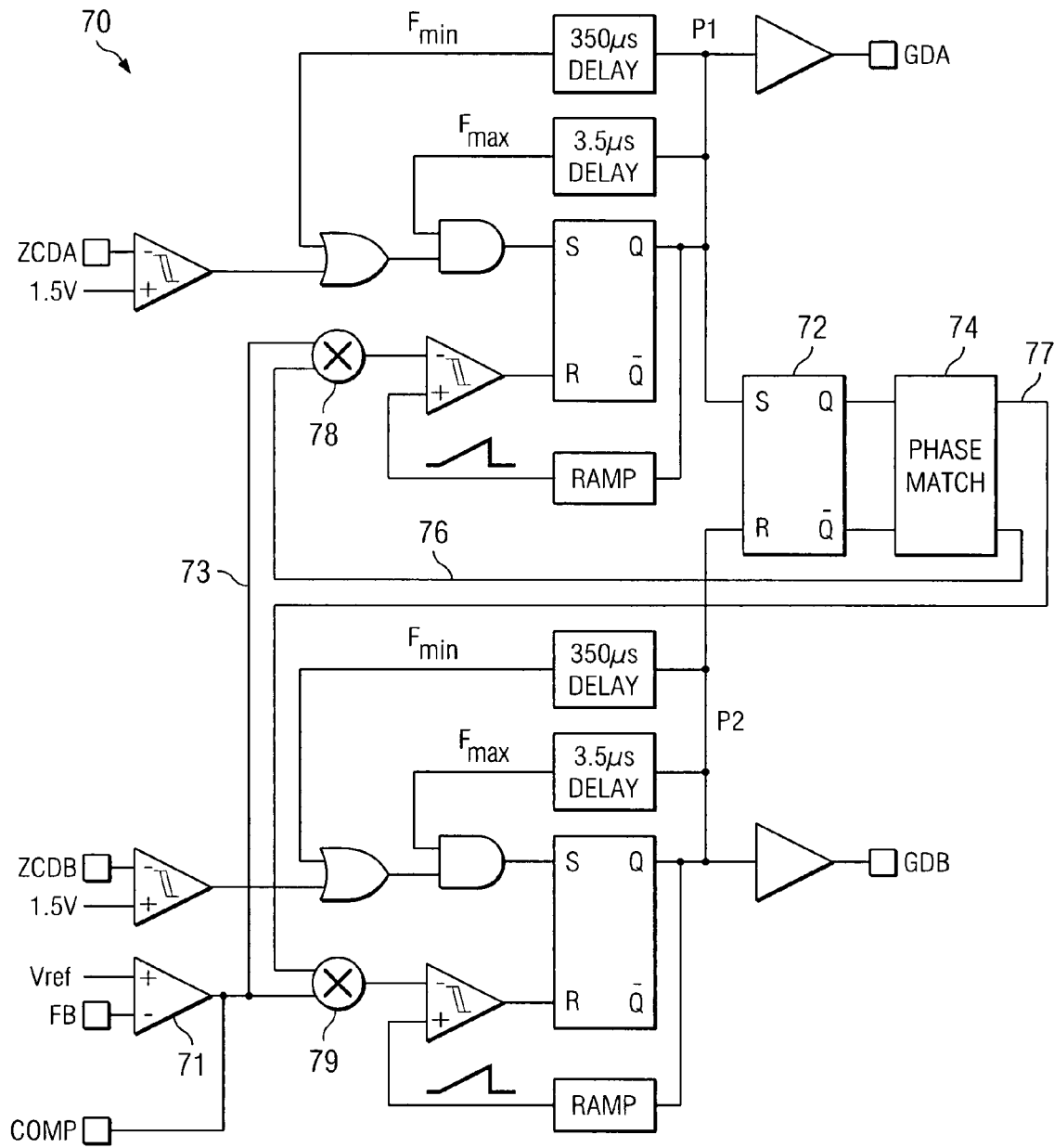
FIG. 7 is a circuit block diagram of a two-phase embodiment in accordance with the present invention.

Referring now to FIG. 7, another exemplary embodiment of a control circuit 70 according to the present disclosure is illustrated. In this embodiment, the control signals used to drive power switches of two separate phases P1 and P2 drive an edge triggered flip-flop 72. The outputs of edge triggered flip-flop 72 are applied to a control loop filter 74. Control loop filter 74 provides a phase matching function to provide error signals 76,77 that adjust the separation of phases P1,P2 to track with each other and maintain a desired phase separation. In the two phase example in FIG. 7, the periodic waveforms in phases P1,P2 are maintained to have a 180° phase angled difference.

The periodic waveforms in phases P1 and P2 are PWM signals that drive power switches used to provide periodic power signals that are interleaved in accordance with the present invention. The gate drives are provided through points GDA and GDB based on phases P1 and P2, respectively. The periodic signals in phases P1 and P2 are applied to an edge-triggered flip-flop 72, so that flip-flop 72 receives phase difference information depending upon how the set and reset inputs of flip-flop 72 are activated. The outputs of flip-flop 72 maintain the respective S and R edge-triggered states until reset or set, respectively, by edge-triggered inputs on an alternate input of flip-flop 72. Accordingly, the desired shape of the outputs of flip-flop 72 are complimentary, 50% duty cycle PWM signals. If one or both of the outputs of flip-flop 72 drift away from the complimentary, 50% duty cycle relationship, that is, if the outputs of flip-flop 72 do not maintain a 180° phase angle separation, the error is detected and fed back to the appropriate phase control to appropriately advance or retard the respective phase angle. Control loop filter 74 provides logic and signaling to generate an appropriate error signal 76,77, for each phase. Error signals 76,77 are applied to multipliers 78,79, respectively, to amplify error signals 76,77 on the basis of a feedback error voltage Fb in conjunction with an operating reference voltage Vref applied to amplifier 71. The output of amplifier 71, as optionally compensated through input COMP, provides a closed loop reference signal with an overall error component for controlling a power output of the overall interleaved multi-phased power supply.

Control signal 73 provides a threshold for causing a reset in each of phases P1,P2, which causes the gate drive signals provided to outputs GDA and GDB to go to a logic low level. The threshold is provided as a ramp that causes a reset in phases P1 or P2 when the output of multipliers 78,79 exceed the associated rap values for their respective phases. The ramp signals for each respective phase restart each time an associated phase P1 or P2 rises to a logic high level. The PWM waveforms in phases P1,P2 are turned off when the associated ramp reaches a threshold level set by the output of amplifier 71 multiplied by error signals 76 or 77. Accordingly, the appropriate error signal 76,77 influences the respective phase control loop error signal provided by amplifier 71 to reach a threshold established by the ramp signals in each phase to reach a reset condition for the associated phase flip-flops at a desired time to obtain an adjustment for a phase angle difference between phases P1 and P2. For example, if the phase angle difference between phases P1 and P2 is greater than 1800, error signal 76 has a decreased value to decrease the output of multiplier 78 to extend the amount of time needed to meet the threshold established by the ramp in phase P1. Accordingly, a reset of phase P1 is slightly delayed permitting the period of a pulse in phase P1 to be extended, thereby decreasing the phase angle difference between phases P1 and P2 toward 180°. Error signal 76 is similarly increased to retard phase P1 if the phase angle difference between phases P1 and P2 is less than 180°. Error signal 77 operates similarly with respect to phase P2 to advance or retard phase P2 by lengthening or shortening the period of the pulse in phase P2.

Figure 8A:
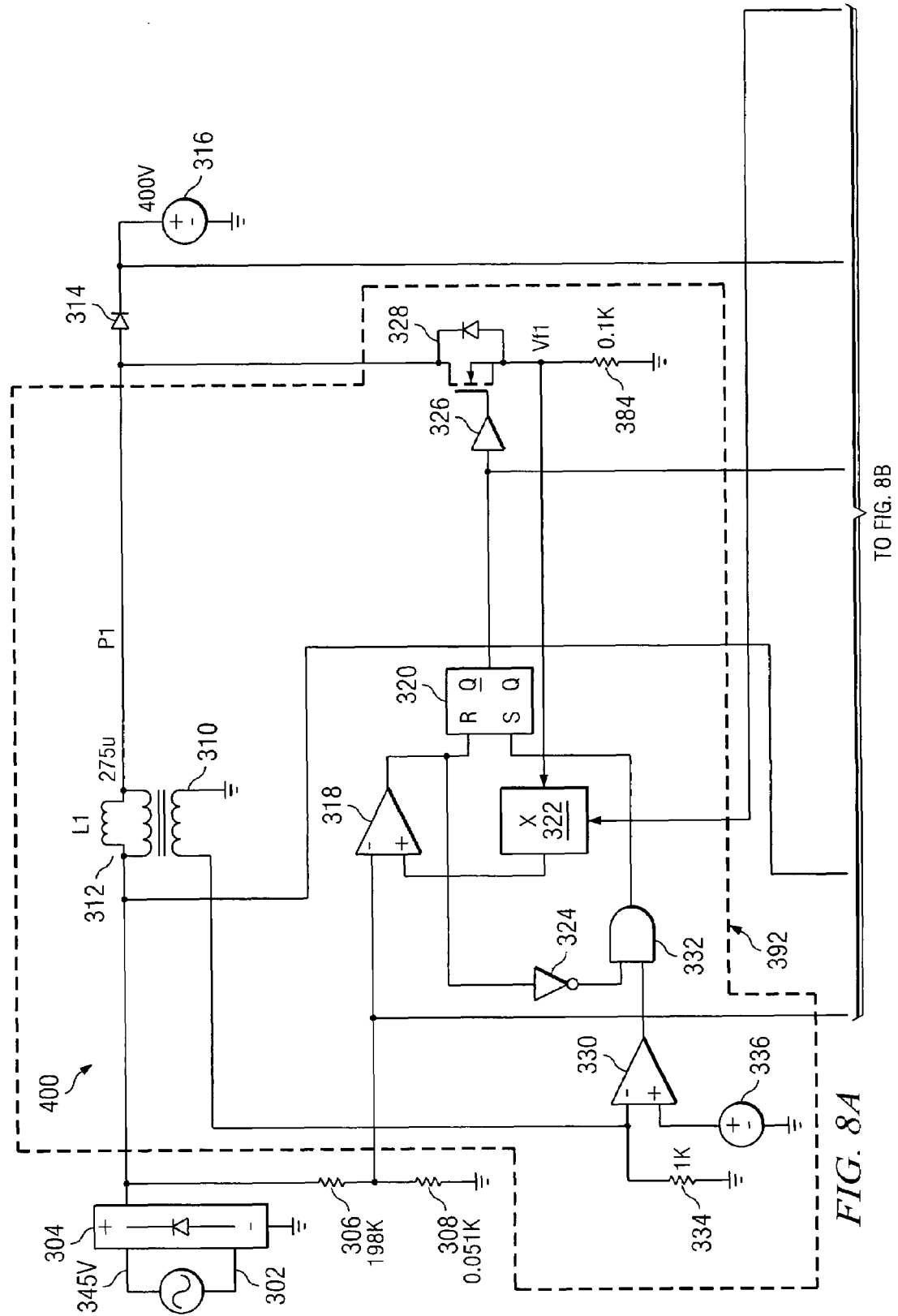
FIG. 8 is a circuit block diagram of a two-phase embodiment in accordance with the present invention.
Figure 8B:
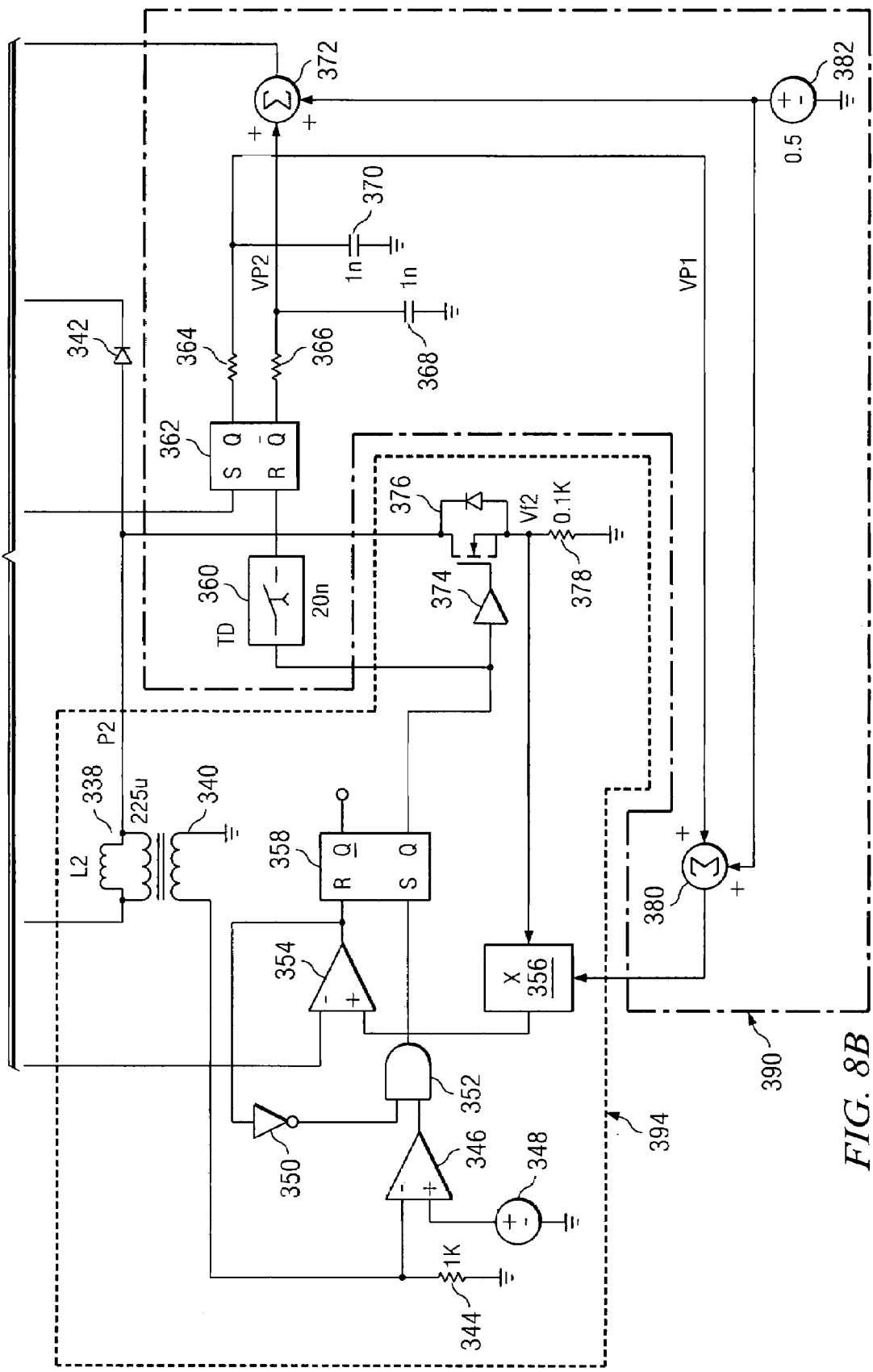

FIG. 8 shows a two-phase, variable frequency interleaved power converter 400. While power converter 400 operates in transition mode, it should be apparent that other modes, including continuous and discontinuous, may be used. The power converter 400 includes AC voltage source 302, rectifier module 304, resistors 306 and 308, diodes 314 and 342, DC voltage output 316 and blocks 392 for phase P1, 394 for phase P2, and a phase detector 390 for feedback and phase control.

Block 392 includes inductor 312 (L1), voltage transformer 310, comparator 318, inverter 324, multiplier 322, AND gate 332, comparator 330, resistors 334 and 384, reference voltage source 336, SR latch 320, on-off switch controller 326, and FET (n-channel)-based switch 328. Voltage Vf1 is generated at the junction of resistor 384 and switch 328.

Block 394 includes inductor 338 (L2), voltage transformer 340, comparator 354, inverter 350, multiplier 356, AND gate 352, comparator 346, resistors 344 and 378, reference voltage source 348, SR latch 358, on-off switch controller 374, and FET (n-channel)-based switch 376. Voltage Vf2 is generated at the junction of resistor 378 and switch 376.

Phase detector 390 includes a time delay 360 (illustratively shown as 20 nanoseconds), SR latch 362, resistors 364 and 366, capacitors 368 and 370, summers 372 and 380, and constant voltage source 382. Time delay 360 avoids simultaneous highs at the S and R inputs of the SR latch 362.

The two different phases operate by charging and discharging inductors L1 and L2, respectively. The charging part of each cycle for each phase begins when the respective inductor current reaches zero. Voltage transformer 310 provides a sign change indication when the current in inductor L1 reaches zero. The sign change indication is input into comparator 330. A reference voltage 336 is also input into comparator 330, and has a value that corresponds to a practical realization indicating the point at which current through inductor L1 is zero. Reference voltage 336 can be zero, or ground potential. Similarly, voltage transformer 340 provides a voltage indicative of the sign of the current flowing through inductor L2, which voltage is input into comparator 346. Reference voltage 348 provides a value that corresponds to a practical realization value that indicates zero current through inductor L2. Reference voltage 348 can be zero, or ground potential. Reference voltages 336,348 may be set to a value to compensate for non-ideal components, for example, and may be dynamic.

As comparators 330 and 346 change state in each respective phase when the current through the corresponding inductor is zero, a new cycle begins in the corresponding phase. Each of phases P1 and P2 operate as fixed on-time power converters, so that power converter 400 inherently exhibits a PFC value close to unity. Because each phase begins charging its respective inductor when the inductor current is zero, the power converter 400 operates in transition mode, where each phase is permitted to reach zero current before beginning a new cycle. It should be apparent that power converter 400 may be operated in continuous or discontinuous mode(s) in accord with the present invention. Operation in transition mode offers the possibility of reducing switching losses through zero voltage or zero current switching.

The power converter 400 provides output power based on a desired reference set point, illustrated in FIG. 8 as a node voltage between resistors 306 and 308. The feedback used to control switching, and thus charging and discharging of inductors L1 and L2, is drawn from the voltage across resistors 384 and 378 for phases P1 and P2, respectively. The voltages on resistors 384 and 378 reflect the amount of current flowing through switches 328 and 376, respectively, when the switches are conducting. Switches 328,376 are driven by drivers 326,374. Feedback voltages Vf1 and Vf2 contribute to determining when switches 328 and 376 are switched off, or placed in a high impedance state.

To synchronize phases P1 and P2 to obtain a desired phase angle difference, the point at which switches 328 and 376 are turned off is modified for each phase P1 and P2. The modified turn off point depends on the phase difference between phases P1 and P2, as provided by a relative measure. Phase detector 390 provides the relative measure of phase difference between phases P1 and P2. Phase detector 390 also produces control outputs to influence feedback signals Vf1 and Vf2 in each of phases P1 and P2. The value of the control outputs provided by phase detector 390 for each phase depends upon a timing indication obtained from the other phase. Accordingly, each of phases P1 and P2 is adjusted by advancing or retarding the discharge portion of the cycle, or proportioning the charge and discharge portions, to maintain a phase difference of 180°.

Phase detector 390 includes SR latch 362, the S and R inputs of which are tied to the switch control signals for switches 328 and 376, respectively. When switch 328 is turned on, the S input to latch 362 is active on the rising edge of the signal, and when switch 376 is turned on, the R input to latch 362 is active on the rising edge. The output state of latch 362 changes with the rising edges of the S and R inputs.

The normal, or non-inverted, output of latch 362 controls charging and discharging of capacitor 370, so that when the normal output state is high, capacitor 370 charges through resistor 364, and when the normal output state is low, capacitor 370 discharges. The same operation occurs for the inverted output of latch 362 with respect to capacitor 368. Voltages Vp1 and Vp2 represent the charges placed on capacitors 370 and 368, respectively, during the cycles of each of the different phases P1 and P2. Voltages Vp1 and Vp2 have a periodic cycle that reflects the phase angle difference between phase P1 and P2, as shown in FIG. 6. Constant voltage 382 is illustratively set at 0.5V using the relation $(n-1)/n$. That is, for the case of two phases, N=2 thereby making the constant voltage $382=(2-1)/2=\frac{1}{2}=0.5V$. Voltage Vp1 is summed with constant voltage 382 at summing junction 380 to produce a multiplier contribution to feedback voltage Vf2. Voltage Vp2 is added to constant voltage 382 at summing junction 372 to provide a variable multiplication contribution to feedback voltage Vf1. Accordingly, the point at which inductors L1 and L2 begin discharging, based on feedback voltages Vf1 and Vf2, can be changed by varying the multiplier value supplied by phase detector 390. By shifting the point at which a discharge of inductors L1 and L2 commences, the cycle period of the respective phases changes, thereby changing the relative phase difference between phases P1 and P2.

Operation of phase detector 390 is similar to dual accumulators that add variable values to multiplier values output from summing junctions 372 and 380. The outputs of summing junctions 372 and 380 influence feedback voltages Vf1 and Vf2, respectively, to adjust a time at which a discharge portion of a respective phase cycle begins. With respect to phase P1, the charging of capacitor 368, when the inverted output of latch 362 is high, increases the multiplier value applied to feedback voltage Vf1 by an amount that is related to the phase difference between phases P1 and P2. The inverted output of latch 362 becomes high when a cycle of phase P2 begins, i.e., on the rising edge of the R input, and low when a cycle of phase P1 begins, i.e., on the rising edge of the S input. Accordingly, the output of latch 362 provides a measure of relative phase between phases P1 and P2.

For example, if phase P1 is advanced beyond the 180° phase angle difference desired between phases P1 and P2, the rising edge of the set input does not occur until a later time. Accordingly, the inverted output of latch 362 is high for a longer period of time, which places a larger charge value on capacitor 368. Since the additive value provided to summing junction 372 is increased by the larger charge value, multiplier 322 produces an increased slope output in combination with feedback voltage Vf1. Since the slope of the output of multiplier 322 is increased, the conditions for commencing a discharge part of a cycle, as seen on the R input of latch 320 to turn off switch 328, are met earlier than that of the previous cycle for phase P1. As the R input to latch 320 becomes active earlier, switch 328 is turned off earlier, or placed in a high impedance state earlier, thereby providing an earlier start point for discharging inductor L1. The earlier commencement of the discharge portion of the cycle of phase P1 tends to shorten the cycle period and retard the phase, thereby bringing the phase difference closer to the desired value of 180°.

In the above example, the slope of the output of multiplier 322 is changed by the increased value supplied by summing junction 372 over a portion or all of a charging part of the cycle for phase P1. Accordingly, the output of multiplier 322 can have multiple slopes, so that it reaches a value for reference voltage Vref at differing times depending upon how the period of the cycle for phase P1 should be varied, thereby varying the phase difference between phases P1 and P2. The control variable used to modify the slope of the output of summing junction 372 is the value added to summing junction 372 by capacitor 368. This value is dependent upon the timing at which the reset input R to latch 362 receives a rising edge signal from the normal output of latch 358. Capacitor 368 begins to discharge at the beginning of a cycle of phase P1, since the output of latch 320 is a high value at that point, providing a rising edge signal to input S of latch 362, which places the inverted output of latch 362 into a low state. The contribution of charging and discharging capacitor 368 to summing junction 372 is the control variable that influences the slope of the output of multiplier 322, based on the value of feedback voltage Vf1. The change to the slope of the output of multiplier 322 operates to advance or retard the point at which the state of latch 320 is switched to begin a discharge portion of the cycle of phase P1. Alternately, or in addition, the variable slope of the output of multiplier 322 changes the peak of the waveform produced in phase P1, which consequently changes the period of the cycle of phase P1. Viewed another way, the charge and discharge portions of the cycle of phase P1 are proportioned to vary the cycle period and thus the phase angle difference between phases P1 and P2.

Phase P2 is similarly controlled based on the variable additive value provided by capacitor 370 to summing junction 380. The charge placed on capacitor 370 depends upon the state of the normal or non-inverted output of latch 362. Based on a rising edge signal applied to the R input of latch 362, capacitor 370 begins discharging as the charge portion of the cycle of phase P2 begins. The influence of the varying added value Vp1 supplied to multiplier 356 is related to the phase angle difference between phases P1 and P2. As with the control for phase P1, the output of multiplier 356 applied to the non-inverting input of comparator 354 has a modified slope with a value dependent upon the value of voltage Vp1. The modified slope of the output of multiplier 356 helps to indicate when the discharge portion of the cycle for phase P2 should begin. The value applied to the non-inverting input of comparator 354 determines the point in the period of the cycle of phase P2 when discharging of inductor L2 begins, by providing a high value to the R input of latch 358, thereby turning off switch 376.

A desired phase angle difference between phases P1 and P2 can be achieved by obtaining a particular duty cycle for the normal and inverted outputs of SR latch 362. For example, with two phases to be separated by a phase angle of 180°, the normal and inverted outputs both have a 50% duty cycle. Another way to view the desired relationship of the normal and inverted outputs of SR latch 362 is that they are complements of each other. Similarly, the rising edges of inputs S and R are separated by a phase angle of 180° when the waveforms in phases P1 and P2 have a desired phase angle relationship. As another example, the phase detector for a three-phase system has a duty cycle of 33% where the phases are separated by 120°. In the three phase exemplary embodiment where the phase detector is configured as an SR flip flop, the rising edges of the S and R inputs to the SR flip flop are separated by 120° when the waveforms in the three phases have a desired phase angle relationship. These illustrative examples can be extended to the general case, where the duty cycle of a given phase detector 1/n %, where n is the number of phases. Similarly, when the phase detectors are implemented as SR flip flops, the rising edges of the S and R inputs to the SR flip flop are separated by 360°/n, where n is the number of phases, when the waveforms in the phases have a desired phase angle relationship.

With the variable period times of the waveforms in phases P1 and P2 adjusted to obtain a desired relative phase difference between phases P1 and P2, power converter 400 provides low output current ripple, reduced peak input current, and increased output ripple frequency, making the output ripple easier to filter. As the phase difference between phases P1 and P2 is continually adjusted, the frequency of the waveforms in phases P1 and P2 tends to be adjusted toward an average frequency, derived from an initial, potentially differing frequency in each of phases P1 and P2. For example, while the values for inductors L1 and L2 should match, in practice it is difficult to obtain close tolerances on these components without a prohibitively high cost. Consequently, phases P1 and P2 operate at differing frequencies when free running. With the synchronization provided by the concept according to the present invention, phases P1 and P2 can be synchronized to a common, average frequency.

Figure 9:
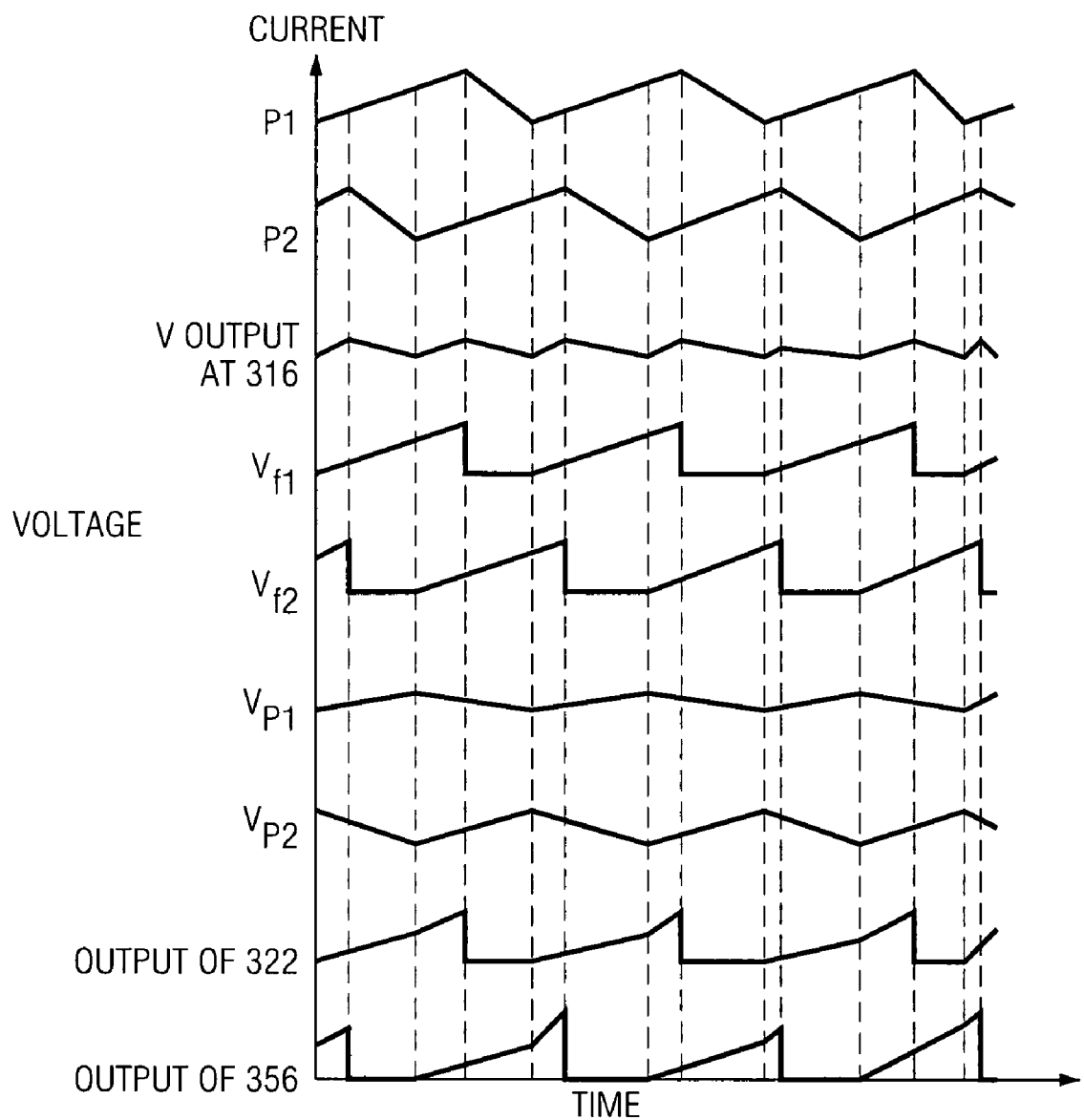
FIG. 9 is a timing diagram illustrating operation of the circuit of FIG. 8.

FIG. 9 shows an exemplary timing diagram of another embodiment, i.e., the power converter 400, of the present invention. The horizontal axis shows time. The vertical axis shows voltages for phases P1, P2, output voltage Vout, feedback voltages, Vf1, Vf2, voltages Vp1, Vp2, and outputs at multipliers 322 and 356. A person having an ordinary skill in the art would appreciate that a similar timing diagram can be drawn for a power converter having three or more phases.

Figure 10:
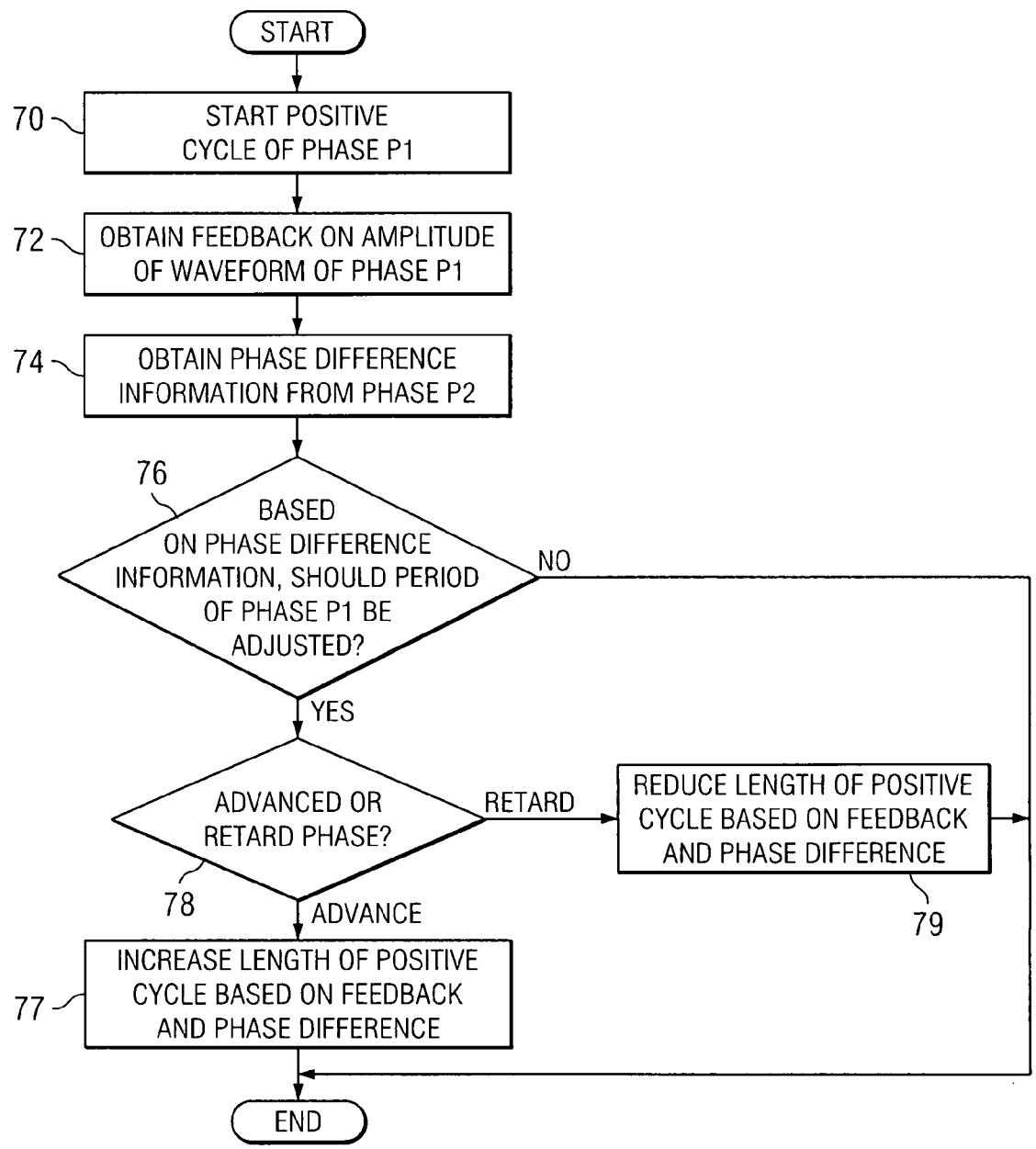
FIG. 10 is a flow diagram illustrating operation of a two-phase embodiment in accordance with the present invention.

FIG. 10 shows an exemplary flowchart describing the steps and decisions for advancing or retarding the phase angle of phase Pl. On the start of a positive cycle of phase P1, as indicated in block 70, a feedback is obtained on the amplitude of phase P1 in block 72. Phase difference information is obtained from the other phase, i.e., phase P2 in block 74. Block 76 indicates that no phase adjustment is done if the measured phase difference between phase P1 and phase P2 is negligibly different from the desired phase difference. However, in the case a phase adjustment is desirable, as indicated in the YES branch of decision block 76, decision block 78 determines whether the phase should be advanced or retarded. If the phase angle of phase P1 should advance, the length of the positive cycle of phase P1 is increased, as indicated in block 77. Similarly, if the phase angle of phase P1 should be retarded, the length of the positive cycle of phase P1 is reduced, as indicated in block 79. A person having an ordinary skill in the art would appreciate that similar steps and decisions can be taken for phase P2 with respect to phase P1.

Figure 11:
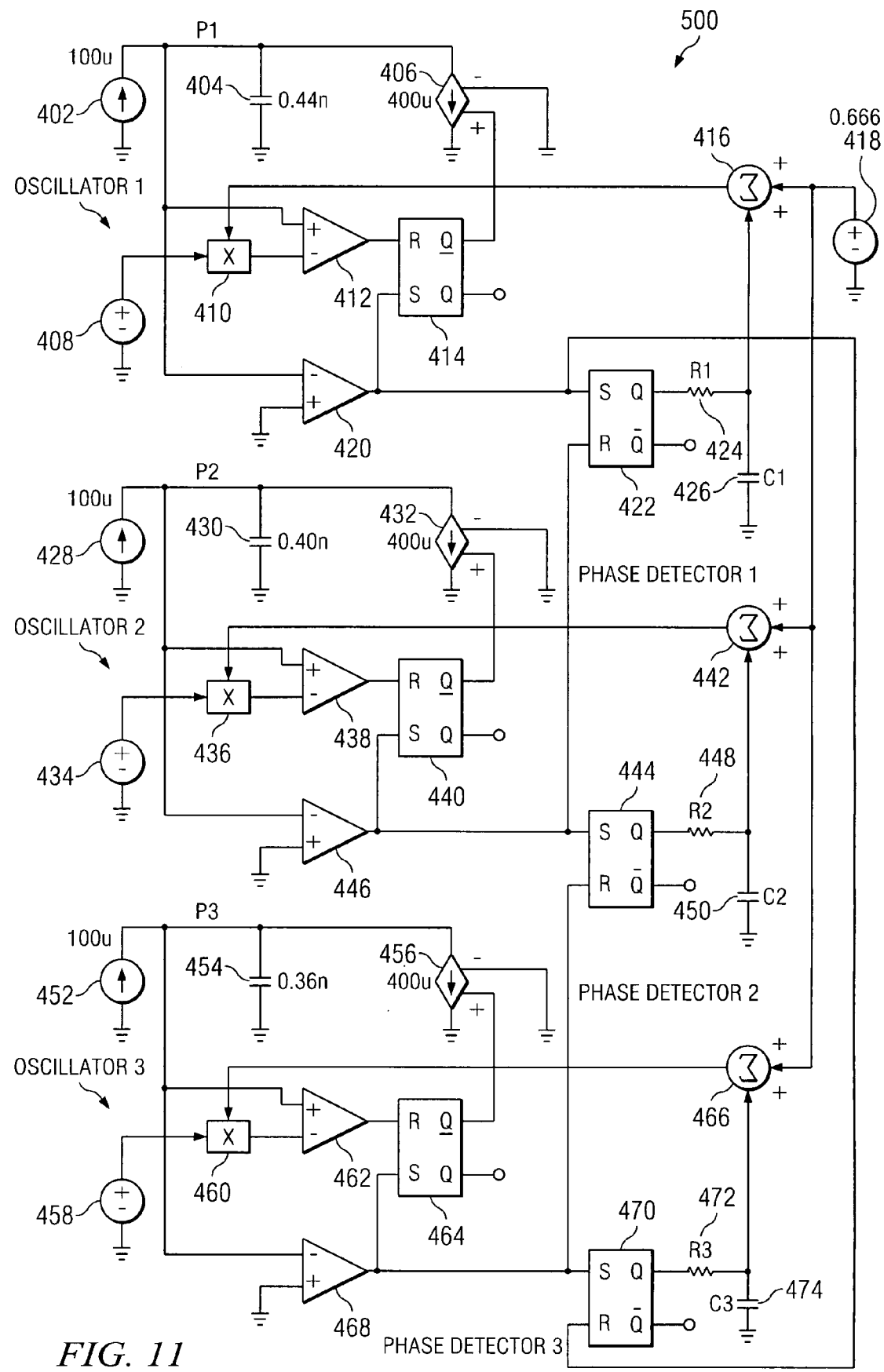
FIG. 11 is a circuit block diagram illustrating application of the inventive concept in a three-phase configuration.

Referring to FIG. 11, a 3-phase embodiment of the present invention is illustrated generally as power converter 500. The diagram for power converter 500 is provided as a more general representation of a 3-phase converter, with each phase being represented by variable frequency oscillators 1, 2 and 3. Although not shown combined together in a single output, each of the waveforms in phases P1, P2 and P3 has a desired phase angle separation of 120° from the waveforms of the other phases to provide phase synchronization.

Each of phases P1, P2 and P3 is controlled to have a desired phase difference with respect to each other with a similar control configuration to that illustrated and described with respect to power converter 400 in FIG. 8. Phase P1 of converter 500 includes a multiplier 410 with a voltage input 408 that is multiplied with a value that depends upon the contribution to summing junction 416 by capacitor C1. Capacitor C1 begins charging when the normal output of latch 422 is high, and discharges when the normal output is low. The normal output of latch 422 transitions to a high state upon a rising edge of a pulse being delivered to the S input of latch 422. The pulse input, provided by comparator 420, marks a beginning of a cycle for phase P1. The output of comparator 420 is a pulse due to the feedback from capacitor 404 being applied to the inverting input of comparator 420, the non-inverting input being tied to ground, or zero potential. Accordingly, when capacitor 404 discharges to just below zero, comparator 420 changes state to provide a high level output to the S input of latch 414, thereby turning off switched current supply 406, and permitting capacitor 404 to charge with current source 402. As capacitor 404 charges, the voltage applied to the inverting input of comparator 420 rises above zero, causing the output of comparator 420 to transition to a low state, thereby establishing a pulse marking the beginning of the cycle for phase P1.

The pulse applied to the S input of latch 422 causes the normal output to transition to a high state, thereby charging capacitor C1. Capacitor C1 continues to charge from the rising edge of a pulse provided by comparator 446 is applied to the R input of latch 422 to reset the normal output to a low state, thereby permitting capacitor C1 to discharge. The separation of the rising edges of the pulses output from comparators 420 and 446 represents the phase difference between phases P1 and P2. Accordingly, the charge placed on capacitor C1 similarly represents the phase difference between phases P1 and P2.

If the phase difference, i.e., an operating phase difference, between phases P1 and P2 increases, a greater charge is placed on capacitor C1 than when phases P1 and P2 have a desired phase separation. The larger charge placed on capacitor C1 contributes to increasing the value supplied by summing junction 416 to multiplier 410, so that the output of multiplier 410 has a ramped output. The ramped output applied to the inverting input of comparator 412 produces a longer time interval before comparator 412 produces a pulse output to the R input of latch 414 to change the state of the inverted output of latch 414 to begin the discharge portion of the cycle of phase P1. By extending the charging portion of the cycle of phase P1, the period of the cycle for phase P1 is increased, thereby reducing the phase difference between phases P1 and P2.

Similarly, if the phase difference between phases P1 and P2, i.e., an operating phase difference, is smaller than the desired phase difference, a smaller charge is placed on capacitor C1. The smaller charge on capacitor C1 causes the output of multiplier 410 to ramp down, and comparator 412 produces a pulse output to the R input of latch 414 earlier than occurred in a previous cycle of phase P1. The earlier initiation of the discharge portion of the cycle of phase P1 shortens the period of the cycle for phase P1, thereby increasing the phase difference between phases P1 and P2.

The above-described operation of controlling a phase difference between phases P1 and P2 also applies to controlling the phase difference between phases P2 and P3, and between phases P3 and P1. Accordingly, if each of oscillators 1, 2 and 3 has different frequencies when free running, by matching a phase difference between each of phases P1, P2 and P3, the frequencies of oscillators 1, 2 and 3 tend to change toward a frequency representative of an average of the free running frequencies produced by oscillators 1, 2 and 3. Indeed, power converter 500 shows differing values for each of capacitors 404, 430 and 454, to ensure each phase has a free running frequency that is different from those of the other phases. The synchronization of the three phases to a single frequency illustrates how the concept of the present invention operates to cover a broad range of frequency capture.

Another way to view the control mechanism for phases P1, P2 and P3, is to note that manipulation of the peak values reached during the charging portion of the cycle for each phase is adjusted to modify the cycle period, and therefore the phase difference between the phases.

Figure 12:
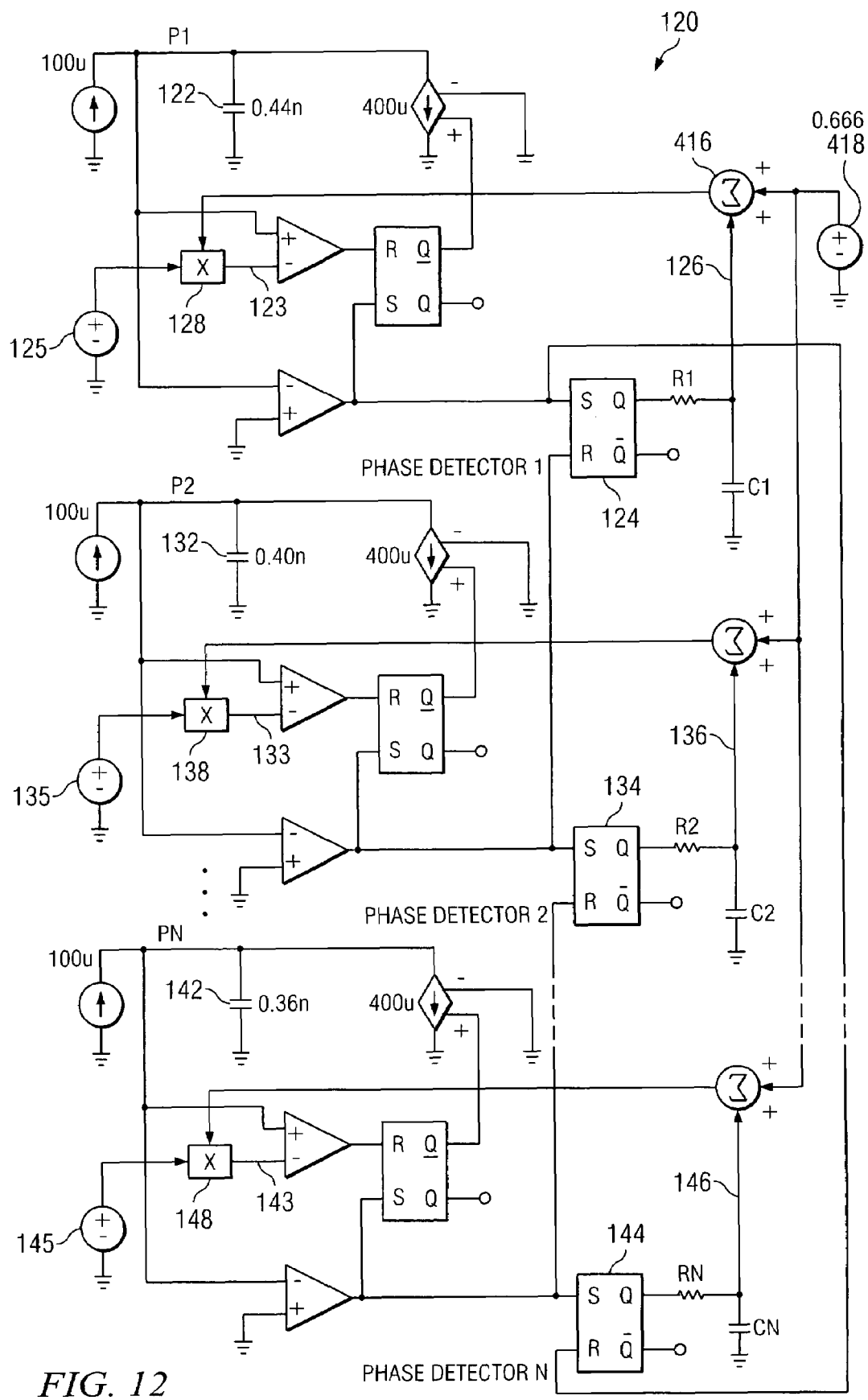
FIG. 12 is a circuit block diagram illustration the inventive concept applied to a configuration having a generalized number of phases.

Referring now to FIG. 12, a multiphase oscillator 120 for N phases is illustrated. Each oscillator phase P1-PN operates by charging and discharging a respective capacitor 122, 132 or 142 between 0 v and a threshold voltage 123, 133 or 143. Pairs of phases have a phase detector 124, 134 or 144 coupled therebetween for obtaining an indication of phase separation. Phase detectors 124, 134 and 144 operate by measuring an interval between a first phase start point and a second phase start point. The output of phase detectors 124, 134 and 144 include an RC network that produces a voltage value 126, 136 or 146 that is dependent upon the phase angle separation. Voltage values 126, 136 or 146 are summed with a reference voltage 121 that has a value dependent upon the number of phases N of 1-1/N. The result of the summing operation is applied to a multiplier 128, 138 or 148 for the given phase, which adjusts threshold voltages 123, 133 or 143 that serve as one of the charging limits for oscillator capacitor 122, 132 or 142, respectively. Accordingly, the frequency of oscillator phases P1-PN is adjusted with threshold voltages 123, 133 or 143, which change as a result of phase angle separations that vary from a desired phase angle separation.

Because each phase detector 124, 134 and 144 is coupled between two phases, the frequency of each phase is adjusted in relation to another phase. As each periodic waveform reflecting the charge on capacitors. 122, 132 or 142 in each phase of the multiphase oscillator reaches 0 v and begins another cycle, the period and phase separation information is passed to an adjoining phase to continue the phase separation adjustment and control. Eventually, the phases all settle toward a given frequency, which tends to be an average of the independent frequencies of all the phases.

The phases may be coordinated and caused to settle to a particular frequency that can be adjusted with an offset to reference voltage 125, 135 and 145. Other offsets or adjustments may be made to maintain a desired overall frequency for the multiphase oscillator.

Figure 13:
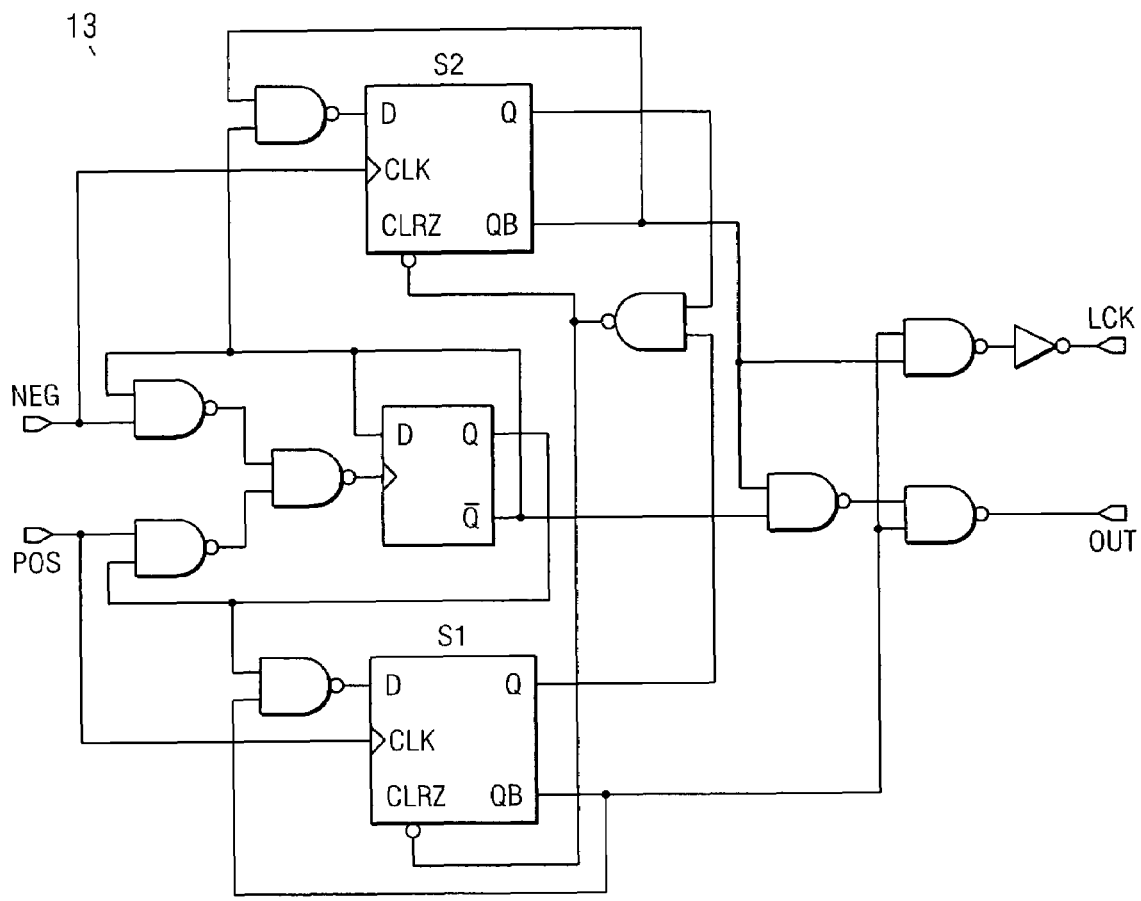
FIG. 13 is a circuit block diagram illustrating an implementation of a phase detector in accordance with an embodiment of the present invention.
Figure 14:
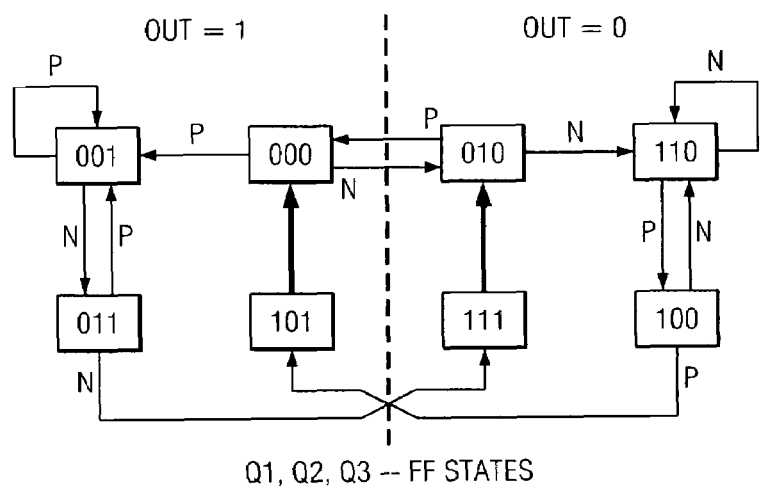
FIG. 14 shows a state diagram for operation of the phase detector of FIG. 13.

Referring now to FIG. 13, another example of a phase detector 130 is illustrated. Phase detector 130 has two inputs, NEG and POS and an output OUT that transitions high on a rising edge of POS and transitions low on a rising edge of NEG. A lock output LCK indicates when the frequency of inputs NEG and POS are equal. Once a lock is achieved, with equal frequency inputs, output OUT can transition with two simultaneous edges of NEG and POS, and the frequency lock is maintained. Referring to FIG. 14, a state diagram for phase detector 130 of FIG. 13 is illustrated.

Figure 15:
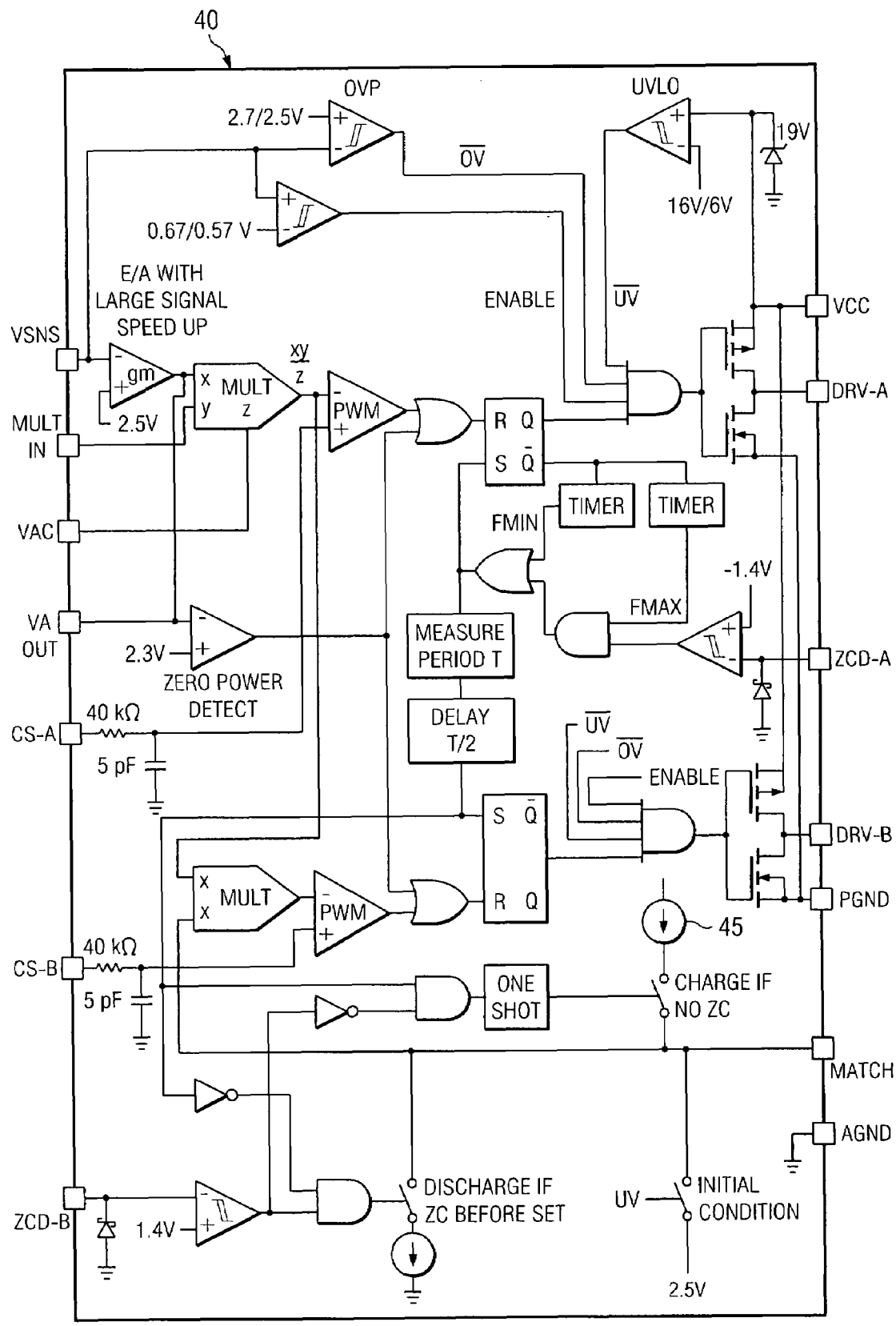
FIG. 15 is a circuit block diagram of an embodiment of a two-phase PFC controller in accordance with the present invention.
Figure 16:
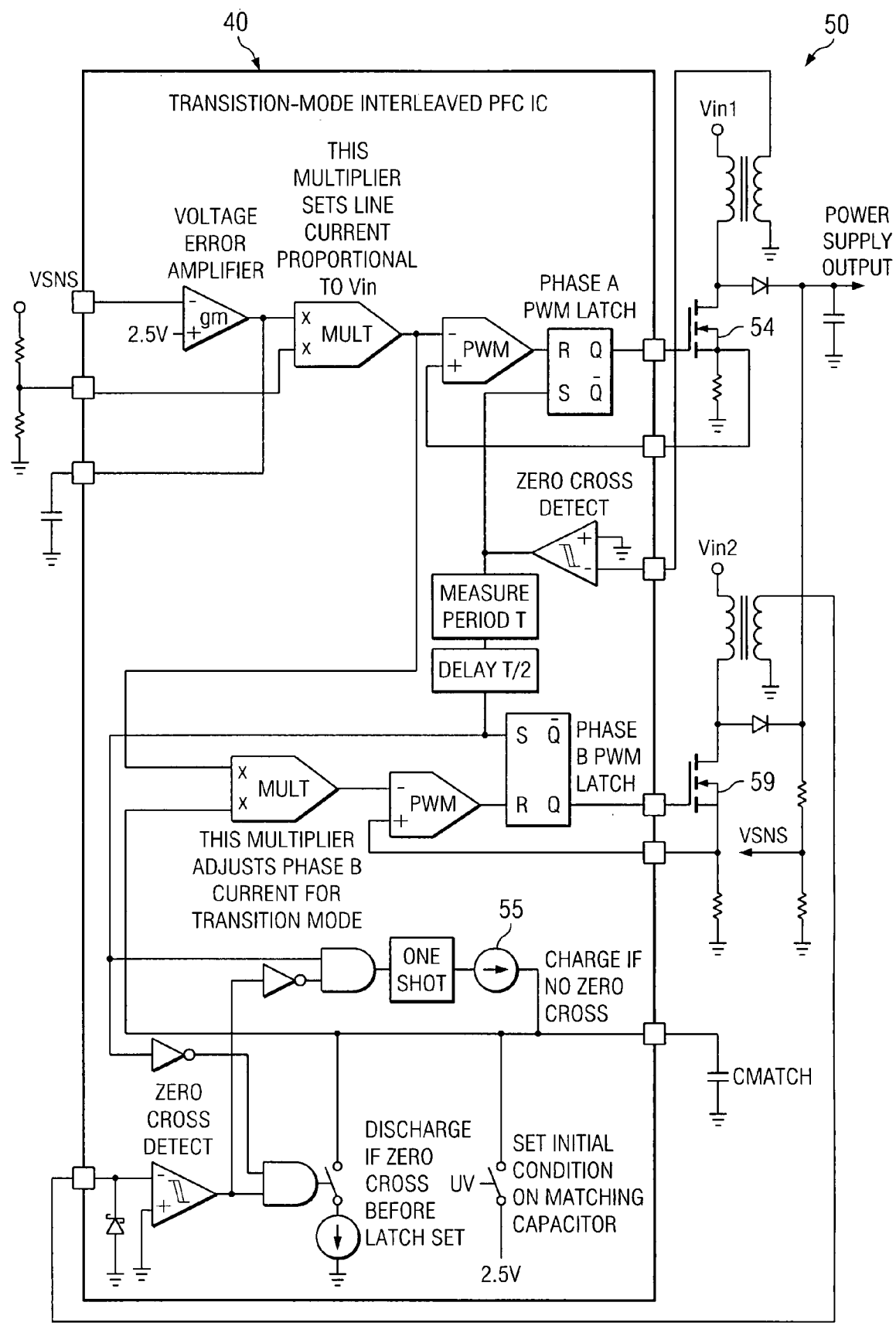
FIG. 16 is a circuit block diagram illustrating the controller of FIG. 15 in a two-phase PFC converter.

Referring to FIGS. 15 and 16, a block diagram of an IC 40 incorporating the concepts illustrated in FIGS. 3 and 4 is shown. IC 40 provides two outputs, DRV-A and DRV-B to switch power switches 54 and 59 of a multiphase interleaved power supply 50 illustrated in FIG. 16. External connections from IC 40 to switches 54 and 59 represents operation of the two different phases, represented by inputs Vin1 and Vin2, that form a part of interleaved power supply 50. In each of the control circuits in IC 40 and power supply 50, a block with the caption "measure period T" is illustrated for the measurement of a cycle of a single phase. This block can be a counter, such as that shown in circuit 30 of FIG. 3, or an accumulator that obtains a value related to the measured phase cycle. For example, an analog accumulation may be used, such as a charge on a capacitor to indicate the length of the phase cycle.

Figure 17:
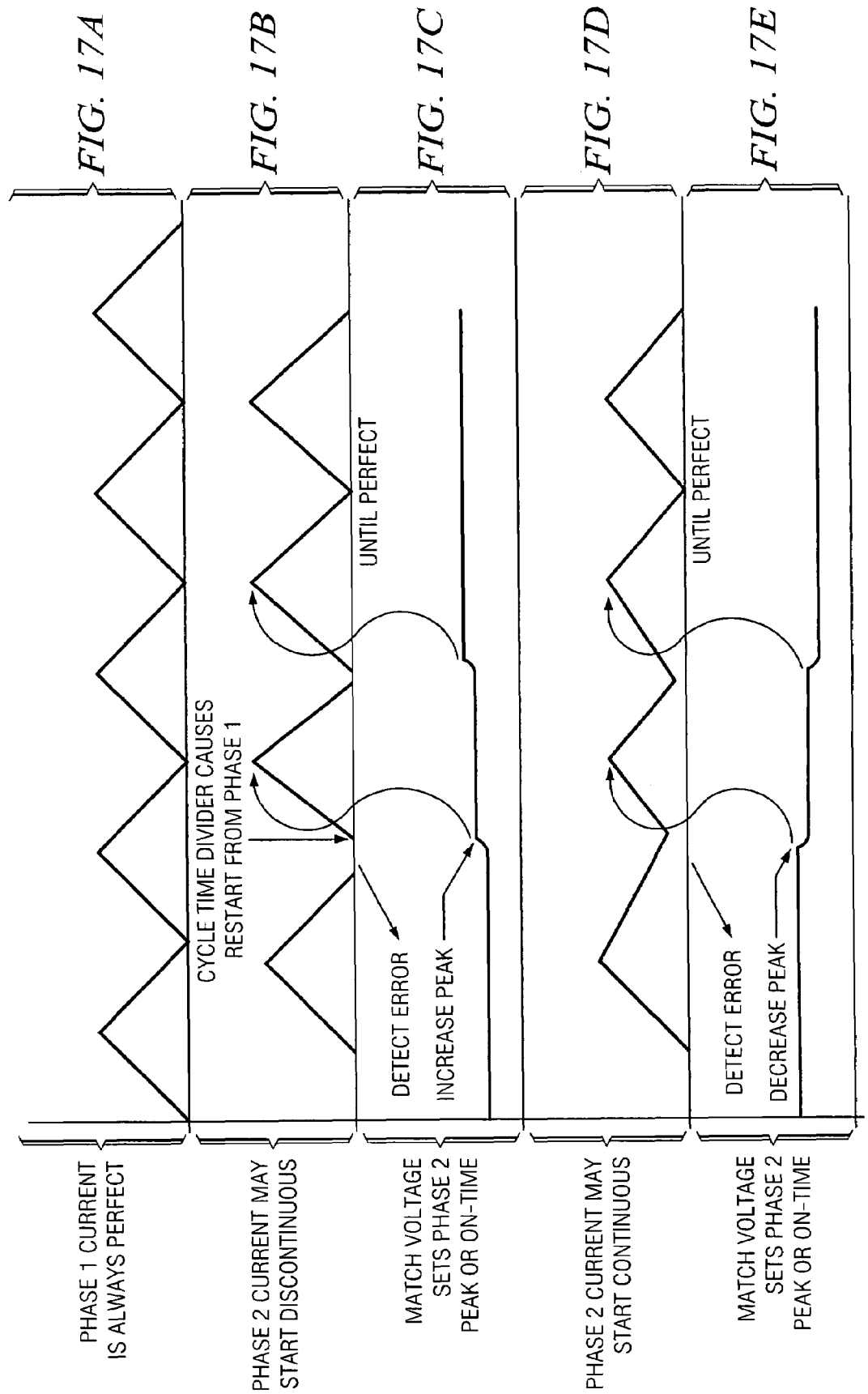
FIGS. 17a-17e are graphs illustrating operation of the circuits illustrated in FIGS. 15 and 16.

Referring also to FIG. 17, an illustration of the phase correction is illustrated in graphical form. If the controlled phase, phase 2 shown in FIG. 17b, becomes discontinuous, or drops to zero before the next cycle should begin, the control voltage applied as a reference for adjusting the phase angle of phase 2 is increased, as shown in FIG. 17c. The upward adjustment in reference voltage is illustrated as charging a capacitor using an internal current source in FIGS. 15 and 16. Alternatively, or in addition, the external capacitor could be replaced with an internal or external counter or timer that is up-counted or reset to provide the reference.

Referring to FIG. 17d, if phase 2 current becomes continuous, that is, a current does not reach zero before the expected beginning of the next cycle, the reference voltage is decreased, as shown in FIG. 17e, to cause phase 2 to advance until separated from phase 1 by 180°. The adjustment in the reference voltage is illustrated as the discharge of an external capacitor in FIGS. 4 and 5. A down-count of a counter or digital storage or a timer may also be used to decrease the reference voltage.

The control loop in the controls illustrated in FIGS. 15 and 16 is a linear control loop with constant gain. Accordingly, the accumulator is modified by a varying value depending upon how far the controlled phase angle separation is from the desired phase angle separation. The error between the actual phase and the desired phase is thus rapidly driven to zero.

Figure 18:
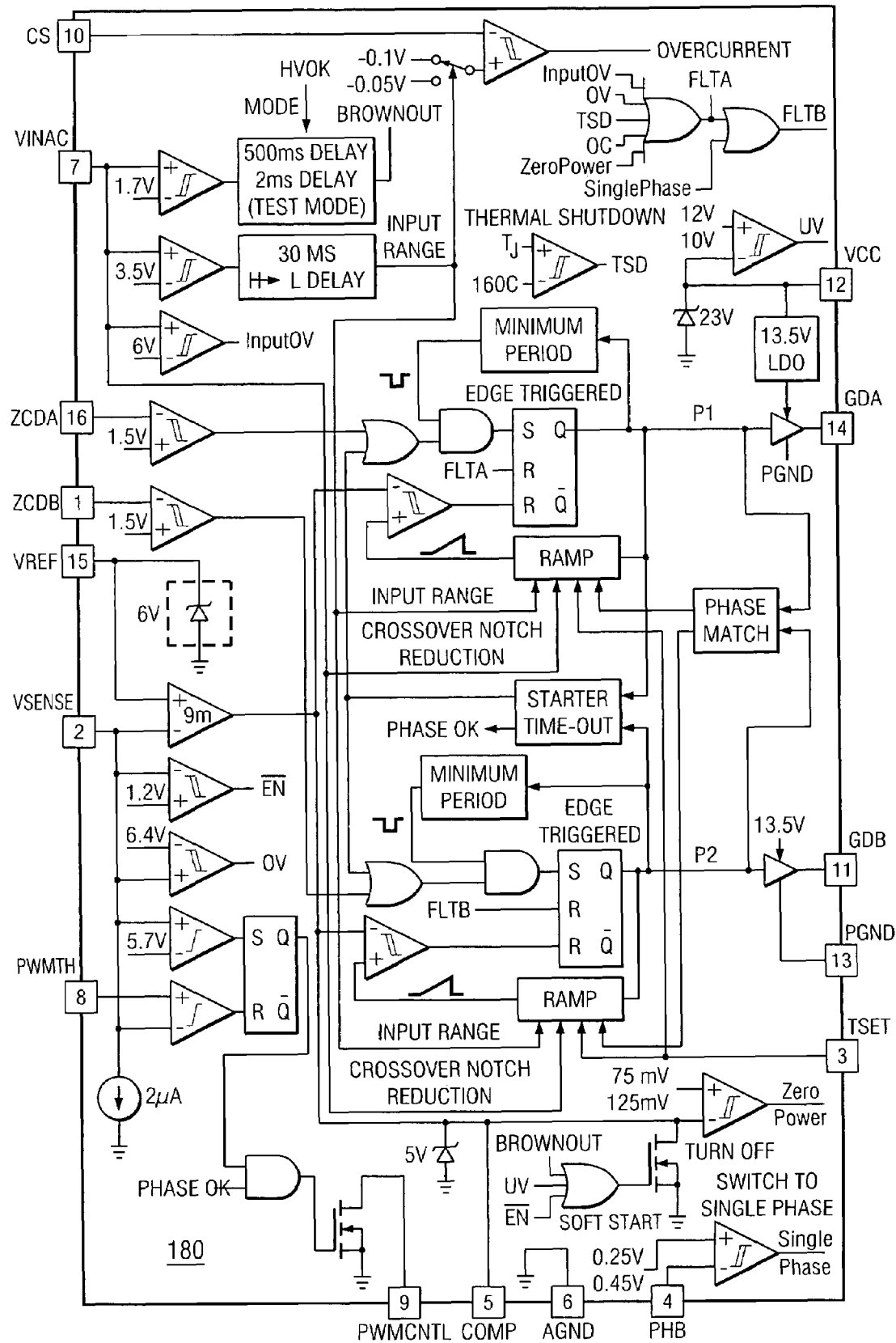
FIG. 18 is a circuit block diagram of a controller for a two-phase PFC converter according to an embodiment of the present invention.

Referring now to FIG. 18, a diagram of the internal configuration of an IC 180 for controlling a multiphase interleaved power supply is illustrated. IC 180 includes various safety and control features for operation of two phases P1 and P2 with frequency synchronization and phase angle separation control. The control for each phase P1,P2 is based on an on-time control, which is advantageous for realizing transition mode operation with power factor correction. IC 180 includes an improved error amplifier, brownout protection, maximum frequency limiting, reduced PFC cross-over distortion and phase management for light load conditions. Each of the above-mentioned features provided by IC 180 is described in greater detail below.

Referring now to FIGS. 19a and 19b, circuit 190 illustrates a configuration for a closed loop control of a multi-phased interleaved power converter in accordance with the present invention. The multi-phased interleaved power converter of the present invention exhibits power factor correction voltage regulation with a fixed on-time control and operation in transition mode. Typically, PFC voltage regulation calls for a low band width closed loop control. High bandwidth closed loop controls tend to distort input current waveforms, which tends to diminish the power factor of the power converter. However, low bandwidth closed loop control typically has poor transient response in relation to significant load changes. Accordingly, load drop-out tends to produce a response that causes overshoot, while load increases tend to produce a response that causes undershoot.

The configuration of circuit 190 provides for low band width closed loop regulation, while limiting overshoot and undershoot to safe ranges. A trans-conductance amplifier 192 provides a consistent closed loop gain for regulating power supply output. The consistent closed loop gain maintains predictable stability and ripple characteristics while providing a low bandwidth loop to contribute to maintaining a good power factor. Amplifier 192 is linear over the range of 5.75 volts to 6.25 volts, as illustrated in FIG. 19b. If the feedback voltage applied to input V-sense exceeds 6.25 volts, as indicated with comparator 194, PWM switching is shut down until the feedback voltage drops below a given threshold. Comparator 194 is a Schmidt comparator with built-in hysteresis to avoid restarting PWM switching until the feedback voltage drops below the hysteresis level. Accordingly, comparator 194 clamps overshoot in high frequency transient responses.

In the case where feedback voltage drops below a predetermined threshold, circuit 190 acts to avoid a significant delay in responding to the under-voltage transient. Comparator 196 senses when feedback voltage V-sense drops below 5.75 volts and closes switch 197 to add a fixed current to the output of amplifier 192. The added current in the under-voltage situation contributes to causing the control loop to slew into regulation more rapidly. The added fixed current is illustrated in FIG. 19b as the large change in current when voltage V-sense reaches 5.75 volts.

With the configuration of circuit 190, the closed loop gain is maintained at a consistent value to obtain consistent stability and ripple characteristics. At the same time, circuit 190 permits limitation of overshoot and undershoot in responding to transients to maintain operation of the power converter in a safe range.

Referring now to FIG. 20, a brownout and range change detection circuit 200 is illustrated. Power supplies may be used in a number of environments, where line or utility power input may have different characteristics. For example, line voltage in the United States is typically specified at 120 VAC, while line voltage is Europe is typically specified at 220 VAC. To provide additional flexibility, some power supplies accommodate a number of different line input voltages. One configuration for accommodating a number of line input voltages selects a high range or a low range based on an inspection and determination of the input voltage. Previous implementations to detect brownout conditions provide for rectifying and filter a sign wave input to drive a comparator that compares the filtered signal to a brownout threshold value. This type of approach uses a large filter network that can be challenging to integrate into an IC. Accordingly, the filter is typically external to the IC and occupies an IC terminal.

Circuit 200 provides various thresholds for detection of high and low line input voltage ranges and brownout detection. Circuit 200 can be realized and easily integrated into an IC because the detection circuitry is based on thresholds and timing components rather than rectified and filtered signals. Comparator 202 provides an indication for high and low line input voltage ranges by producing an output based on a comparison of the line input voltage with an threshold VTH2 applied to the inverting input of comparator 202. Threshold VTH2 has a value related to a high line input voltage range. Accordingly, if the input line voltage is in the high range, the output of comparator 202 is triggered to a high logic level to reset a counter 204 and an SR flip-flop 207 By resetting flip-flop 207, an indication of a high range line input voltage is provided to the power converter controller to permit adjustments in operating values to accommodate the high line input voltage range. If line input voltage is below threshold VTH2, the output of comparator 202 remains at a logic low level, which permits counter 204 to count without being reset, based on the input of oscillator 201. Based on the frequency of oscillator 201 and the counting range of counter 204, the timing interval for recovering from fluctuations in line input voltage can be adjusted. In the embodiment of circuit 200, if the line input voltage remains below threshold VTH2 for two power line cycles counter 204 counts to its full count value and causes flip-flop 207 to be set through a carry indication. When flip-flop 207 is set, a low range line input voltage is selected. The selection of a low range line input voltage establishes various values in relation to low range line voltage operation for the power converter controller.

In the event of a low voltage situation for the line input voltage as may occur during a brownout condition, the output of comparator 202 is also set to a low logic level, producing a low range for the line input voltage indication. In addition, if the line input voltage drops below a threshold VTH1 applied to the inverting input of a comparator 203, a brownout condition is indicated. While line input voltage remains below threshold VTH1, comparator 203 produces a logic low level that permits counter 206 to count based on an input from oscillator 201. If counter 206 counts to its full value, a carry output provided to the input of flip-flop 205 sets flip-flop 205 to indicate a brownout condition on the normal output of flip-flop 205. The interval of time between when line input voltage drops below threshold VTH1 and the indication of a brownout condition can be modified based on the frequency of oscillator 201 and the count value of counter 206. In the exemplary embodiment of circuit 200, counter 206 is a 16 bit counter, while counter 204 is a 12 bit counter. The corresponding interval produced by the combination of oscillator 201 and the count value of counter 206 is approximately 32 power line cycles. Accordingly, a brownout condition is declared after a relatively long period of time to avoid entering a brownout mode based on short intervals of power line dropouts. Circuit 200 can be integrated into an IC to avoid large filter components requirements or the use of an IC terminal for a dedicated purpose. Various response times for the functions of circuit 200 can be implemented based on oscillator frequency selection and maximum counter values. In addition, circuit 200 permits an increased response time during a circuit test phase by by-passing some stages of the counters.

Figure 21:
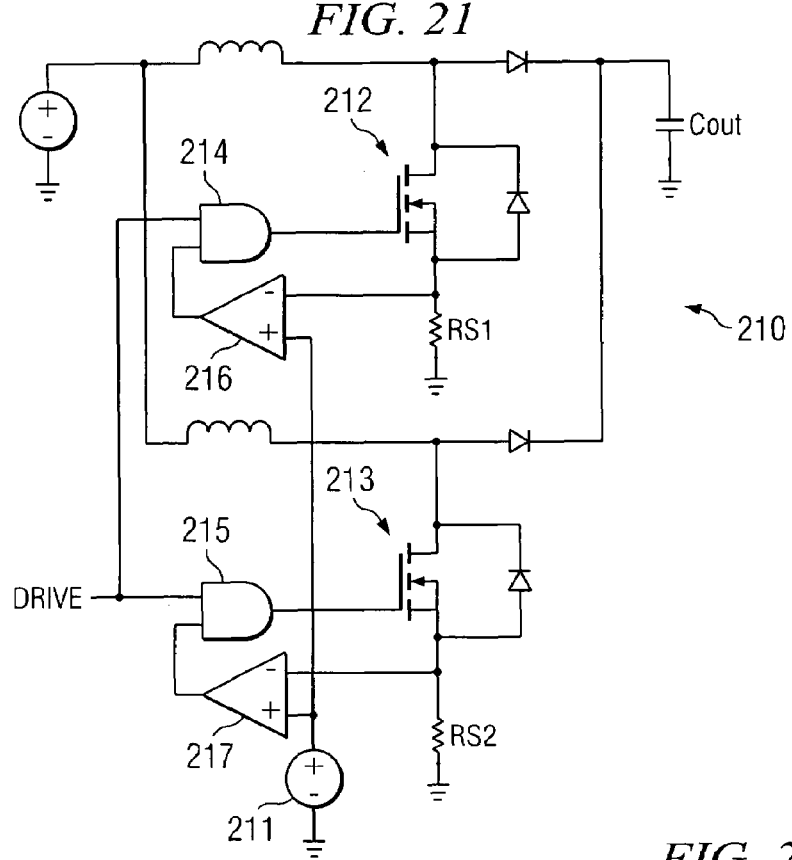
FIG. 21 is a circuit block diagram illustrating overload protection in each phase of a two-phase PFC converter according to an embodiment of the present invention.

Referring now to FIG. 21, a circuit 210 shows a prior configuration for current limiting for current overload protection in a multi-phased power converter. Operation of the multi-phased power converter illustrated in circuit 210 in transition mode permits the power converter to attain inherent overload protection as long as the output voltage is greater than the input voltage. However, during startup, the initial conditions of the multi-phase power converter can cause high currents that can be harmful to power switches 212,213. At startup, capacitor $C_{out}$ has a voltage of zero, so that operation of power converter 210 at startup draws a large initial current to charge capacitor $C_{out}$, which may damage or destroy switches 212,213. To avoid large current draw conditions and to limit current to safe levels, switches 212,213 are gated with AND gates 214,215 that can shut off switches 212,213 in high current conditions. AND gates 214,215 are controlled with comparators 216,217, respectively, which operate to provide an indication if a current drawn through switches 212 or 213 is greater than a corresponding reference voltage 211. The current measure through switches 212 and 213 is obtained by measuring a voltage across sense resistors RS1 and RS2, respectively. When the current through either of switches 212,213 produces a voltage across a corresponding sense resistor RS1 or RS2 that exceeds reference voltage 211, the output of the associated comparator 216,217 falls to a logic low level, disabling a respective AND gate 214,215 to turn off the respective power switch 212,213. When either of power switches 212,213 are turned off using the configuration of circuit 210, they must be re-enabled, for example by providing a start pulse to the disabled switch to permit the power converter to again begin oscillating once current reaches a safe level.

The use of two sense resistors in the configuration of circuit 210 can be somewhat costly, since resistors RS1 and RS2 are typically precision resistors with small values to avoid thermal losses. In addition, a configuration of circuit 210 provides no facility for dealing with current transients, other than by initiating a restart after an over-current limit has been triggered and the associated switch has been shut down. Sense resistors RS1 and RS2 also tend to produce some noise injection in the current sensing circuit.

Figure 22:
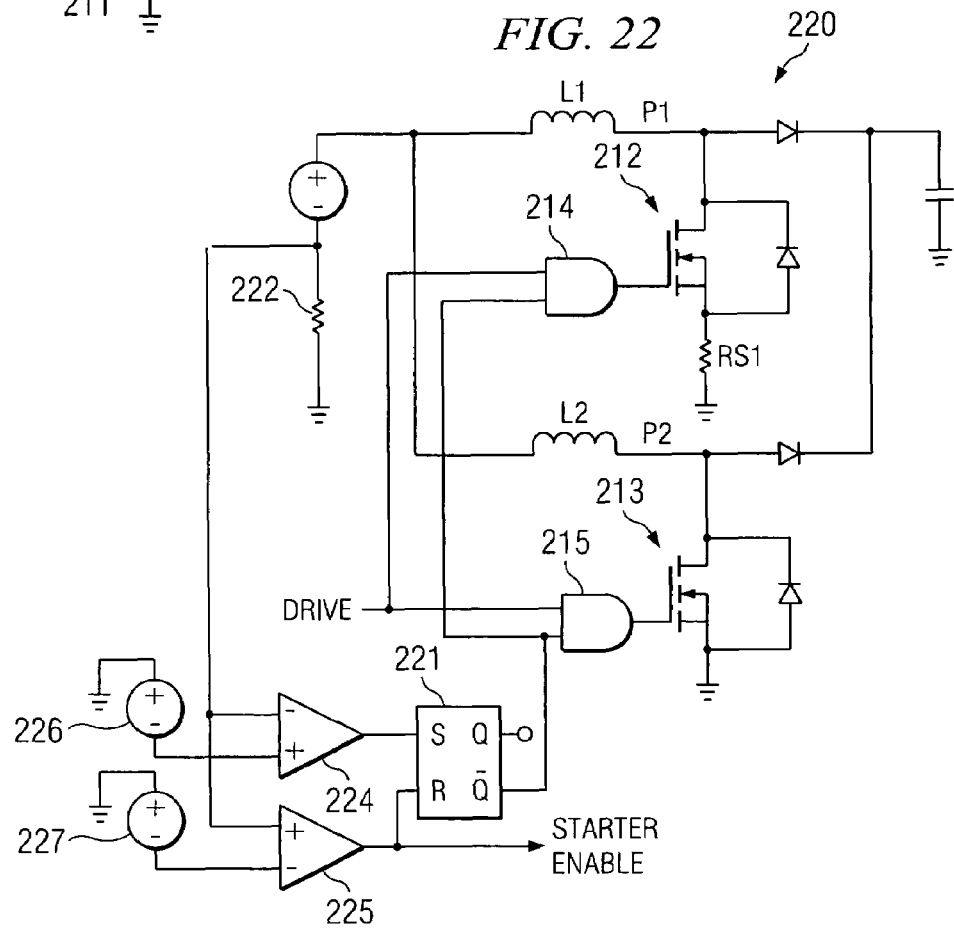
FIG. 22 is a circuit block diagram illustrating overload protection based on input current in a two-phase PFC converter according to an embodiment of the present invention.

Referring now to FIG. 22, a current limit protection circuit 220 is illustrated in accordance with an exemplary embodiment of the present invention. Circuit 220 includes a shunt resistor 222 coupled to the input current of the power converter. The input current corresponds to a sum of the currents in inductors L1 and L2. Accordingly, the voltage across resistor 222 represents the sum of the currents in inductors L1 and L2, and can be used to determine a control for a high and low threshold for current limit and protection. The voltage across shunt resistor 222 is a negative voltage value applied to the inverting input of a comparator 224, and a non-inverting input of comparator 225. Comparator 224 operates to detect a high current level in relation to a threshold established by voltage source 226. Comparator 225 operates to establish a low current threshold in relation to voltage source 227. When the magnitude of the voltage on shunt resistor 222 exceeds the magnitude of voltage source 226 in a negative direction, comparator 224 produces a logic high level output that is applied to the S input of SR flip-flop 221. The logic high level applied to the S input of flip-flop 221 produces a logic low level on the inverted output of flip-flop 221, disabling switches 212 and 213 through AND gates 214,215, respectively. Reference voltage 226 is set to a negative value based on the resistance of shunt resistor 222 and the sum of the currents through inductors L1 and L2 at a peak value to trigger a current overload shutdown. The current overload shutdown disables both of switches 212,213, which remain disabled until the sum of the currents through conductors L1 and L2 drop below a given threshold represented by reference voltage 227. When the magnitude of the negative voltage on shunt resistor 222 drops below the magnitude of reference voltage 227 in a negative direction during the shutdown, comparator 225 produces a logic high output level, which is maintained until the magnitude of the voltage across shunt resistor 222 rises above reference voltage 227 in the negative direction. The high logic level output from comparator 225 resets flip-flop 221, producing a logic high level at the inverting output of flip-flop 221, thereby re-enabling switches 212, 213 through respective AND gates 214,215. When the magnitude of the voltage across shunt resistor 222 rises above reference voltage 227 in the negative direction, the output of comparator 225 changes to a logic low level, while the inverted output of flip-flop 221 remains at a logic high level.

The input current sensed by shunt resistor 222 thus provides a variable for detecting over-current conditions to turn off switches 212,213, and prevents switches 212,213 from turning on until the input current drops to a safe value. In the configuration of circuit 220, the individual power converters of phases P1 and P2 restart oscillation once they are enabled through AND gates 214,215, based on a logic high level output from the inverted output of flip-flop 221. Accordingly, the configuration of circuit 220 prevents starting pulses from being applied to switches 212,213 when there is at least a small amount of current in resistor 222. Comparator 225 thus produces an indication that enables starting pulses to switches 212,213 when both phases are idle.

Voltage references 226 and 227 have negative values, the magnitude of which are chosen to avoid interfering with normal operation of circuit 220, while protecting circuit components under worst case conditions. One worst case condition may occur when phases P1 and P2 operate for several switching cycles at 0° phase difference. In such an instance, an acceptable high current threshold for disabling switches 212,213 is equivalent to approximately twice a maximum peak current value expected in each inductor L1,L2 under normal operation. While this current overload protection threshold is higher than may be expected with prior current limit configurations, it is still acceptable as being within a safe operating range for switches 212,213 because such a 0° phase difference situation occurs for durations that are much shorter than a thermal time constant of switches 212,213. Accordingly, such short high current instances that do trigger current over-load protection have a negligible effect on the junction temperatures of switches 212,213. As an alternative, threshold voltages 226,227 can be made to be inversely proportional to the square of the RMS value of the input voltage, as may be available in an input voltage feed forward configuration.

Figure 23:
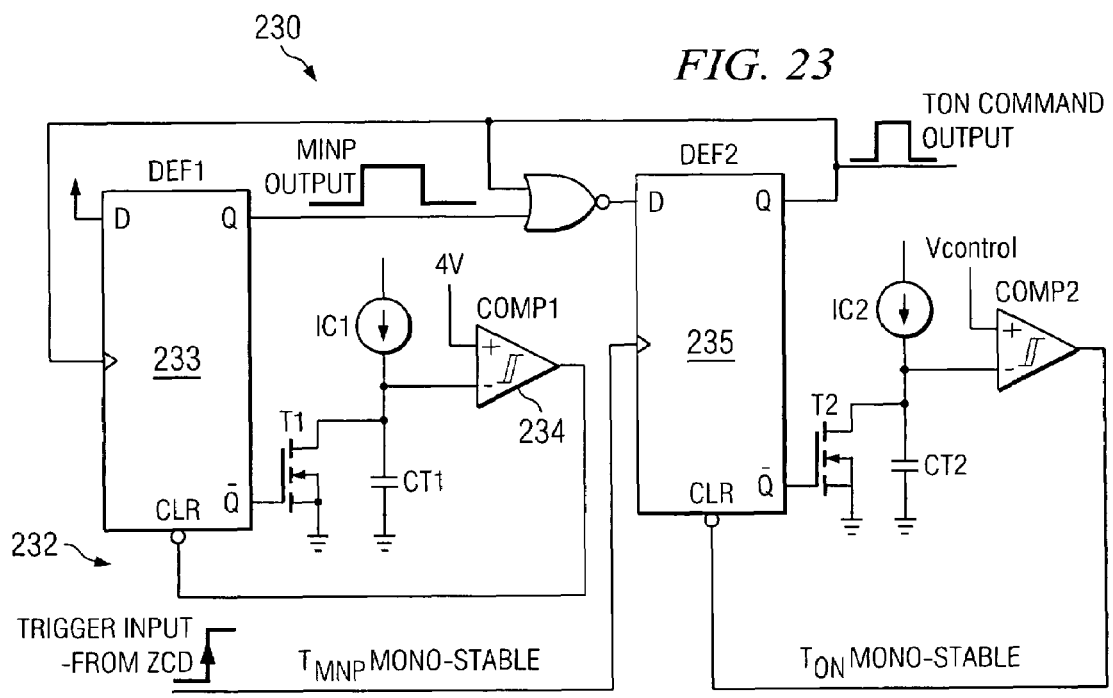
FIG. 23 is a circuit block diagram illustrating maximum frequency switching control according to an embodiment of the present invention.

Referring now to FIG. 23, a circuit 230 illustrates an embodiment of a maximum frequency control in accordance with the present invention. Circuit 230 measures a period of a waveform and limits how short the period can be to provide a maximum frequency control.

Generally, transition mode operation can be achieved with a fixed on-time or peak current control with zero current triggering to establish an average input current waveform that tracks with and is in phase with an input line voltage sinusoid. The switching frequency of the transition mode power converter varies in proportion to the power level of the converter as well as the square of the RMS input voltage. Because of the tracking between input average current and input line voltage, the power converter exhibits power factor correction to achieve a high power factor. However, at high input line voltage levels and light load conditions the frequency of the power converter tends to increase to an operating range that is not desirable. High frequency switching under high line input voltage and light load conditions causes excessive switching losses and/or increased EMI output. Prior variable frequency switching power converters have been designed to maintain conversion efficiency during high frequency range operation, typically at the expense of PFC and input current shaping, thereby tending to increase impedance loading on the input power line.

Circuit 230 illustrates a timer to establish a minimum switching period for a boost converter in a transition mode, fixed on-time power converter. When input line power and load conditions might cause a shorter switching period, circuit 230 limits operation to a maximum switching frequency. The result of the limitation of switching frequency is discontinuous inductor current and provides substantially fixed frequency operation where the square of the RMS voltage to power ratio is high. The maximum frequency can be set to impose a fixed frequency operation where optimum input current shaping is not required. The optimum fixed frequency operation for limiting switching frequency improves the efficiency, the EMI performance and the predictability of the transition mode fixed on-time power converter.

Figure 25:
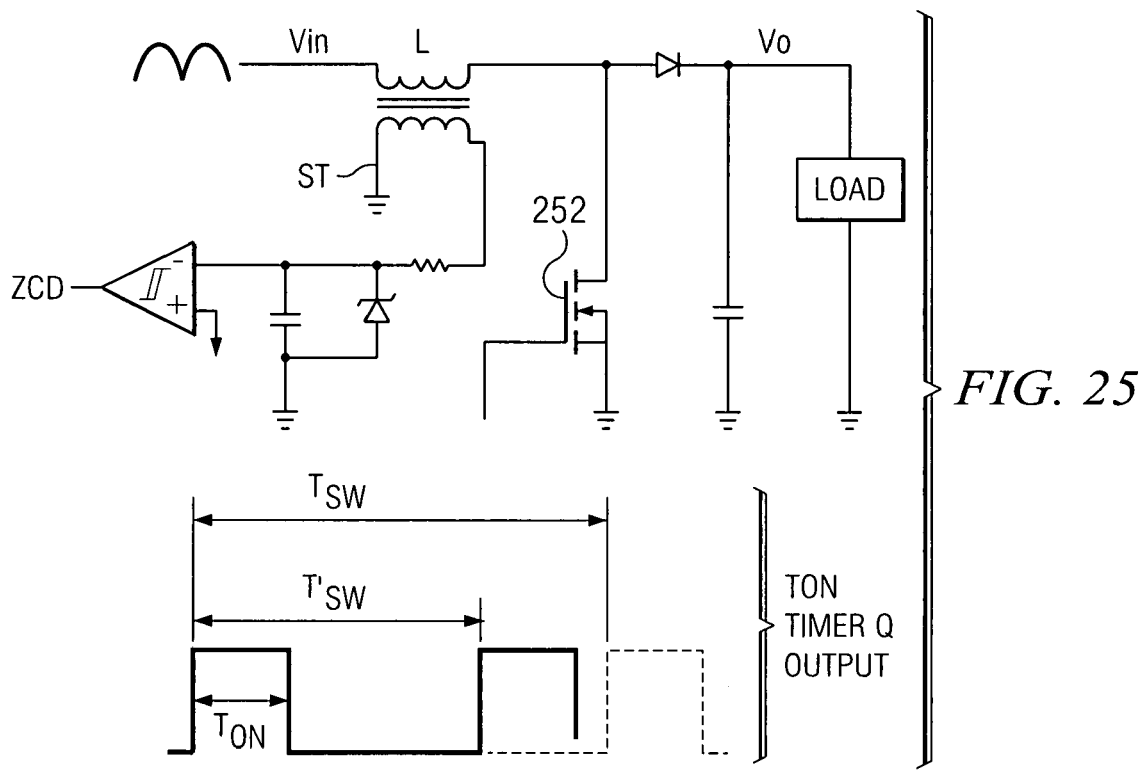
FIG. 25 is a circuit diagram illustrating the application of a switching frequency maximum according to an embodiment of the present invention.

A minimum period timer 232 is composed of a D flip-flop 233, a transistor switch T1, a capacitor CT1, a current source IC1, and a comparator 234. Flip-flop 233 is clocked by the normal output of D flip-flop 235, which represents the fixed on-time signal applied to the gate of a power switch 252 to control current in inductor L (FIG. 25). D flip-flop 235 is clocked by a zero crossing detection signal ZCD, which is derived from a sign change in the current of inductor L as indicated with a second winding ST on boost inductor L (FIG. 25).

Minimum period timer 232 operates by charging capacitor CT1 with current source IC1 while transistor Ti is off after flip-flop 235 changes state, to cause flip-flop 233 to change state. Capacitor CT1 charges to a value of 4 volts, at which point comparator 234 changes state to clear flip-flop 233, to turn on transistor T1 and discharge capacitor CT1, which asserts the active-low clear signal supplied by comparator 234. Accordingly, flip-flop 233 remains in an on state for a period of time defined by capacitor CT1 charging to a value of 4 volts by current source IC1. The normal output of flip-flop 233 provides a logic low level to the input of D flip-flop 235 while the minimum period timer is active, so that an on-time command provided by the normal out put of flip-flop 235 remains at a logic low level to avoid turning on switch 252 and delay charging inductor L.

Figure 24:
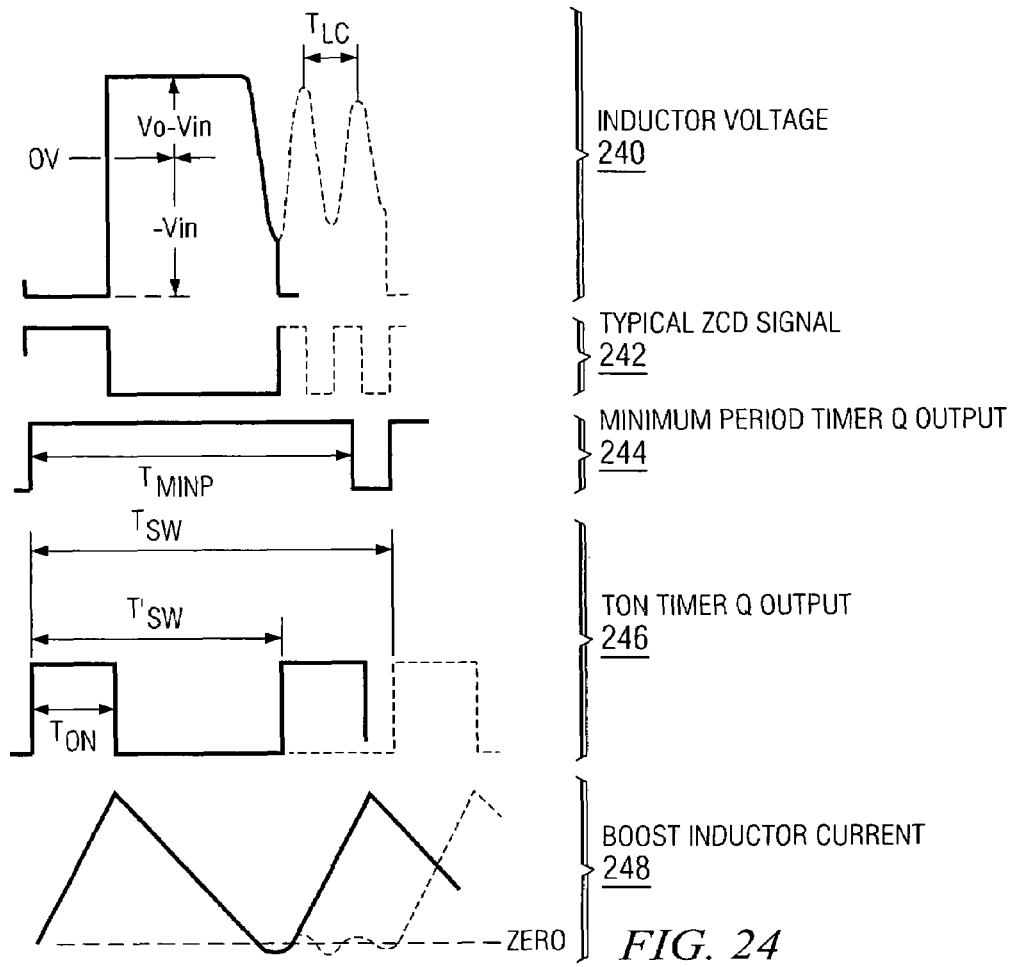
FIG. 24 is a timing diagram illustrating the operation of the circuit of FIG. 23.

FIG. 24 provides a timing diagram of the signal generated by circuit 230 to produce a minimum switching period that results in a maximum frequency control A minimum period timer 244 has an interval of TMINP during which it is active. While minimum period timer 244 is active, T-on timer 246 is permitted to operate through a single cycle. The next cycle for T-on timer 246 is shifted to the rising edge of the next zero crossing detection ZCD 242 that follows interval TMINP, as indicated in dashed lines. While minimum period timer 244 is active, boost inductor current 248 fluctuates near zero and inductor voltage 240 follows a sinusoidal shape due to the light load conditions. The fluctuation of boost inductor current 248 near zero produces multiple rising edges for ZCD signal 242. One minimum period timer 244 becomes deactive, or reaches a logic low level, the succeeding ZCD signal 242 prompts a fixed on-time cycle provided by T-on timer 246. Accordingly, the fixed on-time pulse provided by T-on timer 246 is shifted until the first rising edge of ZCD signal 242 after minimum period timer 244 times out.

In circuit 230, minimum period timer 232 is a mono-stable oscillator that produces a fixed length pulse whenever a fixed on-time event is initiated. Similarly, the control for the pulse provided for the fixed on-time is also mono-stable, with a period that is dependent upon the output voltage command signal V control. One advantage realized by circuit 230 is that by delaying the fixed on-time pulse until the rising edge of the next ZCD signal 242, zero voltage switching can be achieved for switch 252. In the case where a peak current control is used, a similar configuration to that of circuit 230 can be used to realize maximum frequency operation. In such a peak current control, a minimum period control gates the turn on of switch 252 directly, rather than interacting with a fixed on-time control.

Figure 26:
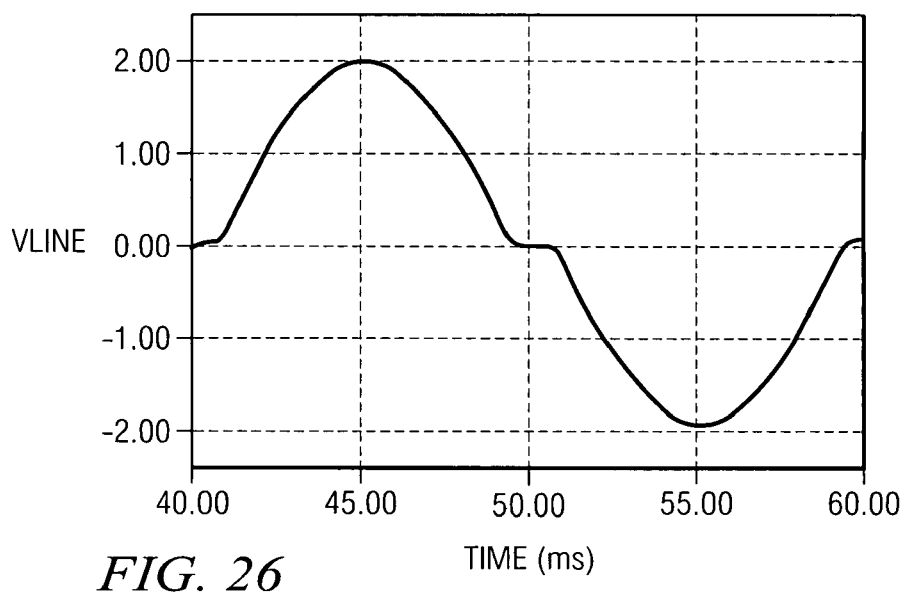
FIG. 26 is a graph illustrating AC line current crossover distortion in a transition mode power converter.
Figure 27:
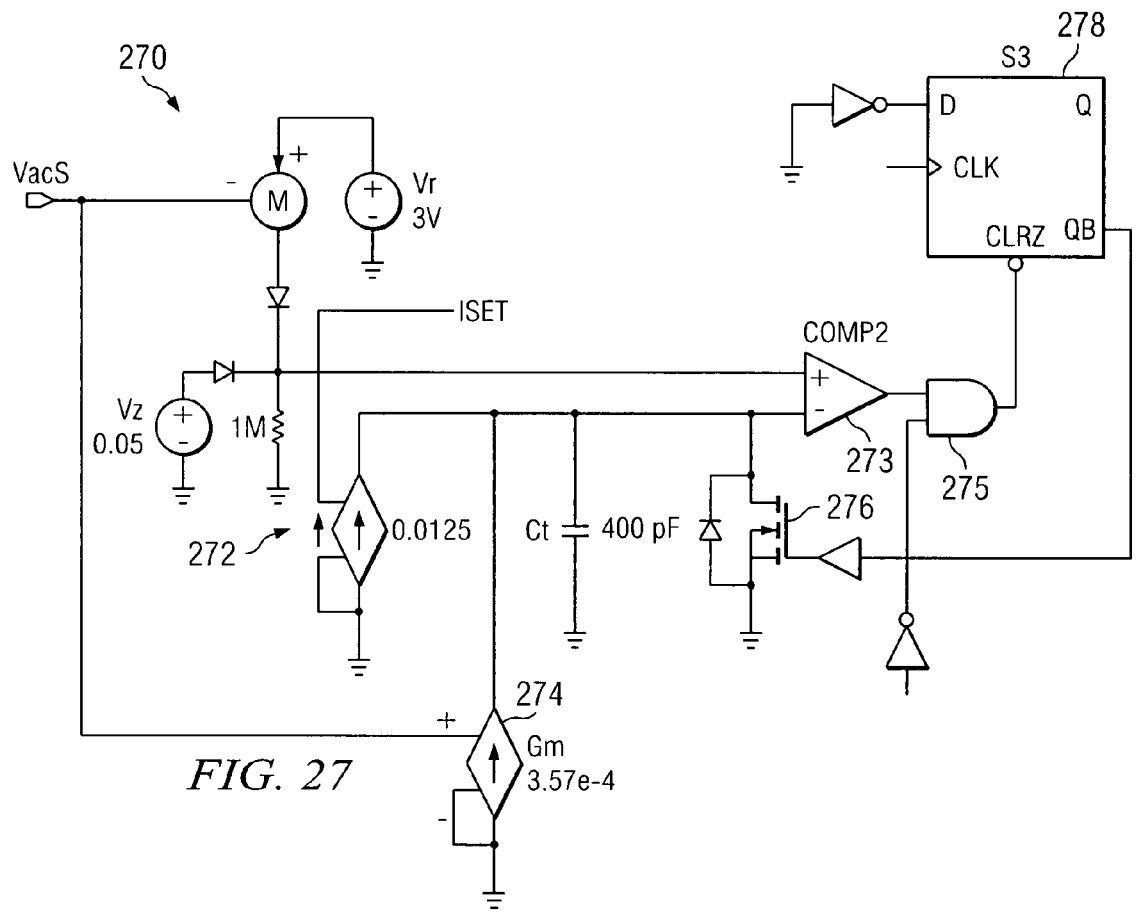
FIG. 27 is a circuit block diagram illustrating the generation of an additive on-time command according to an embodiment of the present invention.
Figure 28:
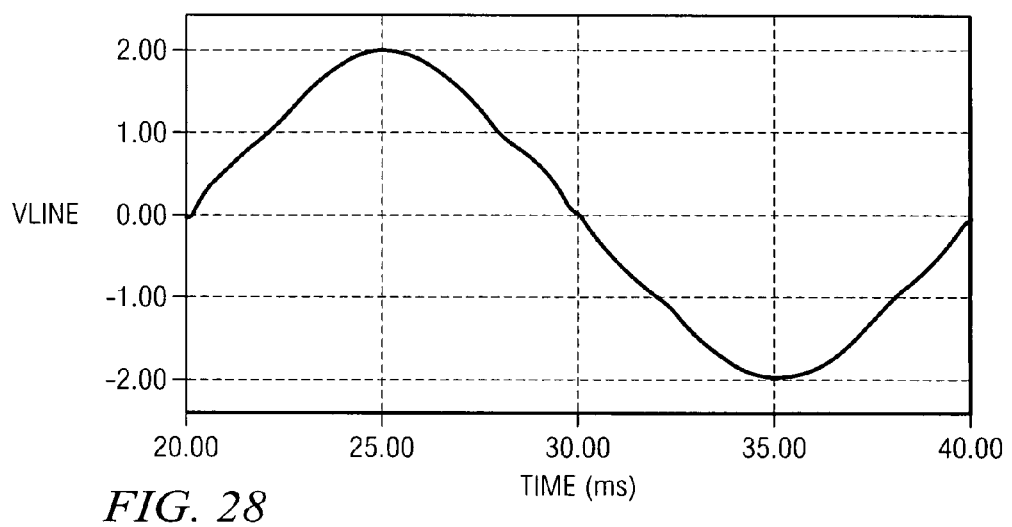
FIG. 28 is an AC line current waveform having reduced crossover distortion.

Referring now to FIGS. 26-28, a feature of the present invention related to reducing PFC cross-over distortion is illustrated. FIG. 26 illustrates cross-over distortion resulting from a dead band around zero voltage crossings in the input current of a transition mode PFC boost stage for a fixed on-time control. The dead band around the zero voltage crossings is a result of energy absorbed in charging a parasitic capacitance on the boost node, that is, the output of the boost inductor. This dead band distortion near zero voltage crossovers results in a degraded power factor and increased total harmonic distortion of the AC line current, particularly at high line power input levels with light load conditions. During such conditions, the energy used to charge the parasitic capacitance is highest and normal nominal current levels are low. Dead band energy flows into and out of the switch node parasitic capacitance and zero energy is delivered to the load during the zero crossing, since the boost diode is not forward biased. That is, the switch node voltage fails to reach a sufficient voltage output level to be higher than the output voltage level to cause the boost diode to be forward biased. These conditions may occur when the on-time of the power switch is insufficient to charge the parasitic switch nodes capacitance, even in conjunction with the resonant excitation from the rectified input voltage, while delivering an appropriate amount of energy to the output. When the input voltage is greater than one half of the output voltage, the resonant excitation of the LC circuit formed by the boost inductor and the switch node parasitic capacitance is sufficient to charge the switch node capacitance to and above the output voltage.

Referring now to FIG. 27, an embodiment of a power switch on-time extension timer 270 in accordance with the present invention is illustrated. By extending the on-time of the boost power switch, the parasitic capacitance at the boost node becomes fully charged when the boost power switch is turned off, so that power is delivered to the load and the dead band region in the input line voltage is significantly reduced, as illustrated in FIG. 28. On-time extension timer 270 provides an on-time that varies with the rectified input line voltage, so that the boost node voltage can have an appropriate value based on the rectified excitation voltage. Accordingly, when the input excitation voltage is at a high level, switch on-time need not be extended by as great an amount to charge the parasitic capacitance to permit output current flow and avoid input voltage cross-over distortion. Similarly, when line input excitation voltage is at a low value, switch on-time is extended a greater amount to appropriately charge the parasitic capacitance at the boost node to permit output current flow and reduce line input voltage cross-over distortion.

Timer 270 operates by charging capacitor CT with one or more switched current sources 272,274 and discharging capacitor CT with switch 276 that turns on when timer 270 times out, as indicated by the state of flip-flop 278. Capacitor CT charges to a value that depends on the line input rectified voltage value, a conditioned version of which is applied to the non-inverting input of comparator 273. Once capacitor CT charges to the threshold value provided in relation to the line input rectified voltage, comparator 273 changes state to provide a low level logic output, turning off AND gate 275 and clearing flip-flop 278 to mark the end of the time extension provided by timer 270.

The magnitude of the on-time extension provided by timer 270 varies as a function of the rectified line input voltage with values of zero to one-half the output voltage. If the rectified line input voltage exceeds one-half the output voltage, the time extension provided by timer 270 is zero. The normal output of flip-flop 278 is added to the on-time command used to drive the power switch, such as by providing the on-time command and the time extension command to the inputs of an OR gate. The clock input to flip-flop 278 initiates the start of the time extension for switch on-time, and is provided by a high to low transition of the normal on-time signal for driving the power switch. The input to switch current source 272 is a current signal ISET, which sets a maximum on-time extension when the rectified line input voltage approaches zero.

Figure 29A:
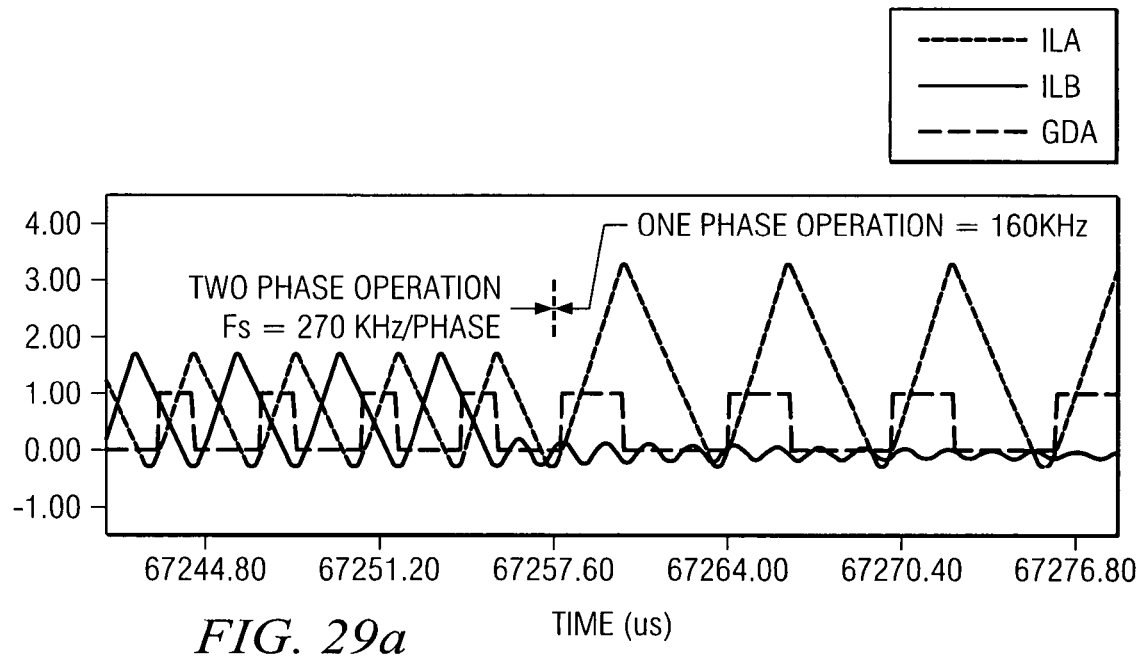
FIGS. 29a-29b are graphs illustrating current and voltage for a phase-managed PFC power converter.
Figure 29B:
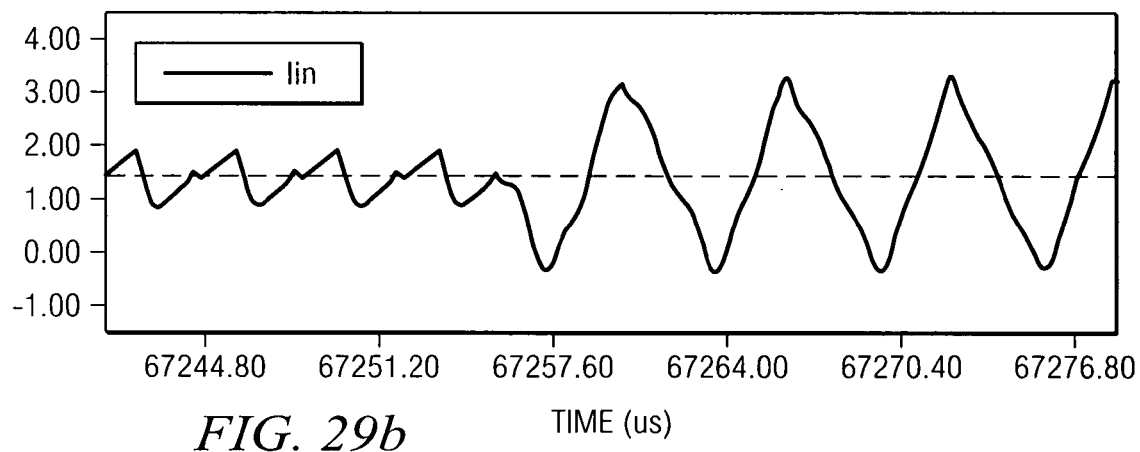
Figure 30:
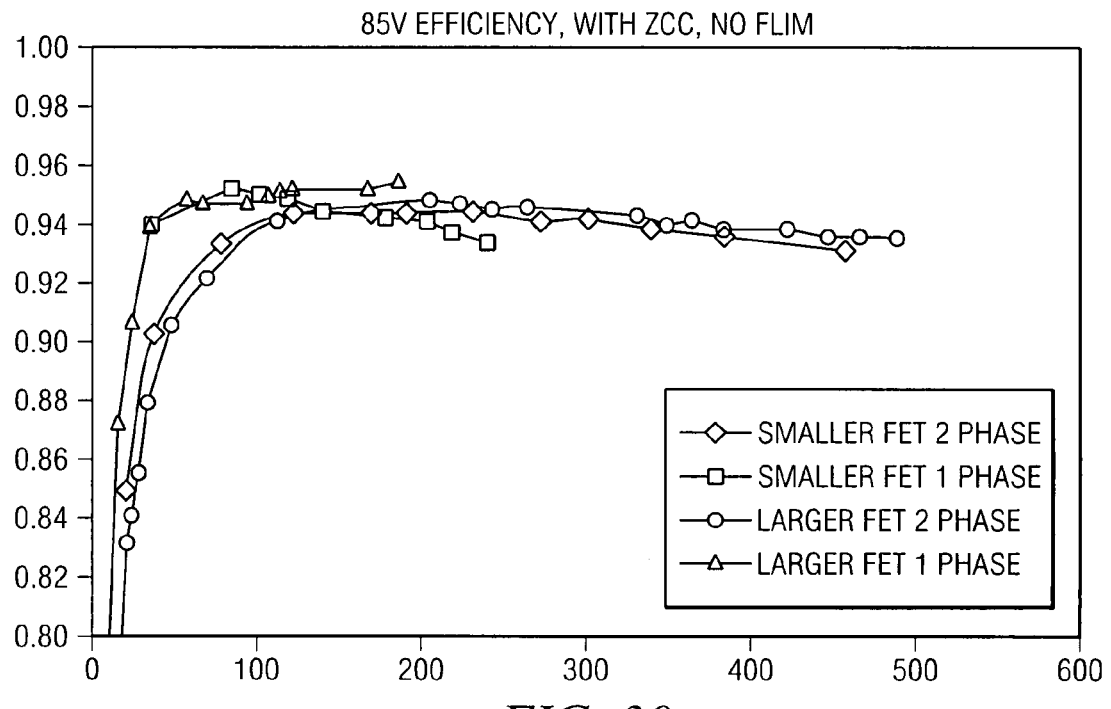
FIG. 30 is a graph illustrating efficiency versus output power for one- and two-phase operation.
Figure 31:
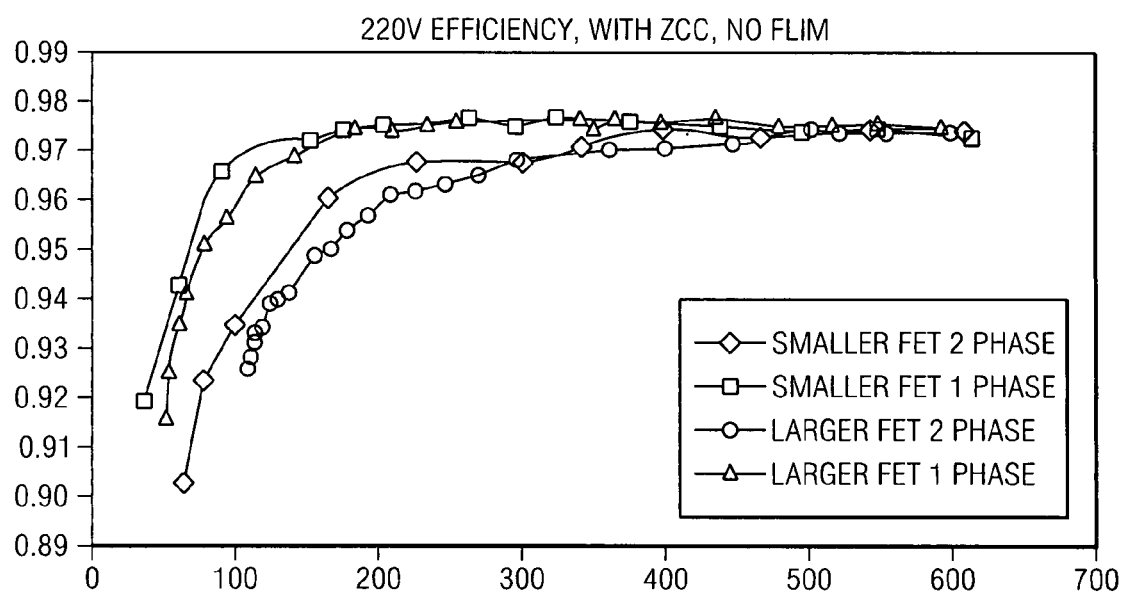
FIG. 31 is a graph illustrating efficiency versus output power for one- and two-phase operation.

Referring now to FIGS. 29-31, an illustration of operation of phase management for a multiphase interleaved power converter is provided. While interleaved multiphase operation for a power converter attains a number of advantages as discussed above, light load operation can incur significant switching losses as a result of high frequency switching and parasitic capacitances. In particular, in a transition mode boost power converter the switching frequency increases inversely with the load and with the square of the input line voltage RMS value. Other drawbacks may be observed with high frequency operation of transition mode boost converter with low current levels, such as increased THD of line input current, unpredictable converter behavior and increased EMI. In accordance with an exemplary embodiment of the present invention, a transition mode boost converter having multiple interleaved phases disables one or more phases to improve power conversion efficiency and overcome the above-mentioned drawbacks. In accordance with one embodiment, a dual-phase interleaved power converter transitions to single-phase operation to reduce switching losses through operation at lower switching frequency and higher peak current levels. Single-phase operation contributes to overcoming the drawbacks of switching losses that dominate the power stage losses in comparison with conduction losses. FIGS. 30 and 31 illustrate efficiency in single-phase operation at light loads at various operating power levels. As can be seen, the efficiency of operation in waveforms B and D is significantly improved at lower power ranges in comparison with waveforms A and C that reflect two-phase operation.

In operation, one phase of two-phase interleaved transition mode boost power converter is disabled. At the same time, the circuit controlling the on-time for the boost switch of the remaining phase increases the on-time by a factor of approximately 2. The increase in on-time for the remaining boost contributes to smoothing a transition from between single and two-phase operation. The peak current is accordingly increased in the boost inductor, and the effective switching frequency is similarly reduced. The lower switching frequency tends to decrease switching losses and improve overall power converter efficiency.

The switch over from two phase to single-phase operation can be provided as a user selectable feature to permit designers to choose a point for phase change-over in relation to switching losses versus the advantages of multi-phased interleaved power conversion. Alternately, or in addition, the point at which phase change-over from two phases to one phase occurs can be set internally or tied to other control signals related to power converter loop control and operational efficiency.

In accordance with an exemplary embodiment of the present invention, a phase change-over to reduce the number of active phases in a multi-phased interleaved power converter is determined based on input current information. The determination of the number of active phases based on input current uses efficiency curves versus input current based on the number of active phases. The efficiency curves may be measured or calculated. Phase activation versus input current may be calibrated with the efficiency curves to obtain a maximum efficiency by selecting the number of active phases based on the given input current. The use of input current information to select the number of active phases to increase efficiency provides better performance and a simpler design than previous solutions that rely on power converter output current determinations. One reason the input current information produced better phase management for improved efficiency is that input current more accurately reflects current transferred in the power converter than typical prior output current measurements. Previous output current measures typically rely on a current measure taken through power switches, which, because they are not always conducting, do not always give information about phase current. As discussed above, with respect to an improved current limit or current overload detection and protection circuit, measurement of input current contributes to providing a more consistent view of current flows in the power converter than might otherwise be achieved by inspecting the current flows through the power switches. By determining appropriate levels of input current information for selecting a desired number of active phases, the efficiency of the transition mode boost power converter can achieve greater levels of efficiency and an optimal number of phases being active for a given load and input.

The concept of phase management is not limited to a multiphase interleaved power converter, but can also be used in other power delivery configurations that include multiple power converters. For example, power converters may be connected in parallel to deliver a specified amount of current to a load for a given application. In the event that the load demand drops to a given level, it is desirable to turn off one of the parallel power converters to improve efficiency. The decision on the number of parallel power converters to maintain an active operation, and when a change-over of the number of active parallel power converters should occur is based on input current information in accordance with the present invention. Accordingly, the determination of a number of active power converters arranged in parallel based on input current to improve overall power delivery efficiency is considered to be within the scope of the inventive features of the present disclosure.

The specific application described above may be generalized to a system and method for synchronizing oscillators without the need of a master-slave relationship. The disclosed concept of synchronizing the frequency in two or more channels is implemented with channels that are not dependent upon each other for a fixed or reference timing sequence. A universal multiphase oscillator results, with no master channel or frequency and no slave channel or frequency. The concept extends generally to two or more phases without limit.

In general, multiple phases are used to coordinate with each other to produce a single unified frequency. As oscillator frequency changes, or as a desired frequency result changes, the various channels, or phases, continue to synchronize with each other to correct for phase mismatches. In general, the resulting frequency is an average of the various frequencies in the various phases. The disclosed system and method synchronizes n oscillators at 360°/n phase separation, and is applicable for any type of oscillation source. The synchronized multiphase oscillator may be applied in any application using multiple synchronized frequencies, for example.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A power converter with two or more interleaved phases having periodic waveforms, the converter comprising:
   phase detector coupled between a pair of phases and operable to generate an indication of a phase angle difference between the periodic waveforms in the pair of phases; and
   a waveform generator operable to control generation of the periodic waveforms, wherein the at least one waveform generator being responsive to the indication to control generation of both periodic waveforms in the pair of phases to form a desired phase angle difference between the periodic waveforms.

2. The power converter according to claim 1, wherein the waveform generator is operable to obtain a power factor correction (PFC) in each phase by controlling the generation of each of the respective periodic waveforms.

3. The power converter according to claim 1, wherein the waveform generator is operable to control generation of the periodic waveforms with variable switching frequency.

4. The power converter according to claim 1, wherein the waveform generator further comprises a fixed on-time control to control generation of the periodic waveforms.

5. The power converter according to claim 1, wherein the power converter further comprises a capacitor in the phase detector to contribute to producing the indication.

6. The power converter according to claim 1, wherein the power converter further comprises a counter in the phase detector to contribute to producing the indication.

7. The power converter according to claim 1, wherein the power converter further comprises a timer in the phase detector to contribute to producing the indication.

8. The power converter according to claim 2, wherein the waveform generator operates in a transition mode.

9. The power converter according to claim 2, wherein the waveform generator further comprises an on-time extension combined with a base on-time to control generation of the periodic waveform.

10. The power converter according to claim 9, wherein the waveform generator further comprises a fixed on-time control to control generation of the periodic waveforms.

11. The power converter according to claim 3, wherein the waveform generator is operable to control generation of the periodic waveforms to have a minimum period.

12. The power converter according to claim 4, wherein the power converter further comprises a single current sensing component.

13. The power converter according to claim 12, wherein the power converter further comprises a low current threshold for restarting switching after an over-current fault.

14. The power converter according to claim 13, wherein the low current threshold is less than half of peak current.

15. A power converter with two or more interleaved phases having periodic waveforms, the converter comprising:
    a plurality of phase detectors, wherein each being is coupled between a pair of phases and operable to generate an indication of a phase angle difference between the periodic waveforms in its pair of phases; and
    a matching number of phase detectors for the two or more interleaved phases.

16. The power converter according to claim 15, wherein the power converter further comprises a controller for generating the periodic waveforms and being operable to deactivate at least one phase at a predetermined low input current level.

17. A method of power conversion for a power converter with a plurality of interleaved phases having periodic waveforms, the method comprising:
    generating a plurality of periodic signals to form the periodic waveforms;
    generating an indication of a phase angle difference between the periodic waveforms in a pair of phases; and
    controlling generation of both periodic waveforms in the pair of phases to form a desired phase angle difference between the periodic waveforms in response to the indication.

18. The method according to claim 17, wherein the method further comprises obtaining a power factor correction (PFC) in each phase by controlling the generation of each of the respective periodic waveforms.

19. The method according to claim 17, wherein the method further comprises controlling generation of the periodic waveforms with variable switching frequency.

20. The method according to claim 17, wherein the method further comprises controlling generation of the periodic waveforms with a fixed on-time control.

21. The method according to claim 18, wherein the method further comprises operating the power converter in a transition mode.

22. The method according to claim 18, wherein the method further comprises controlling generation of the periodic waveform with an on-time extension combined with a base on-time.

23. The method according to claim 22, wherein the method further comprises controlling generation of the periodic waveforms with a fixed on-time control.

24. The method according to claim 19, wherein the method further comprises controlling generation of the periodic waveforms to have a minimum period.

25. The method according to claim 20, wherein the method further comprises sensing current in the power converter with a single current sensing component.

26. The method according to claim 25, wherein the method further comprises restarting switching after an over-current fault based on a low current threshold.

27. The method according to claim 26, wherein the low current threshold is less than half of peak current.

28. A computer-program product comprising:
a computer-readable medium having computer program code embodied thereon for converting power with a power converter having a plurality of phases, the computer program code adapted to:
generate a plurality of periodic signals to form the periodic waveforms;
generate an indication of a phase angle difference between the periodic waveforms in a pair of phases; and
control generation of both periodic waveforms in the pair of phases to form a desired phase angle difference between the periodic waveforms in response to the indication.

* * * * *